(12) United States Patent
Burghardt et al.

(10) Patent No.: US 9,606,140 B2
(45) Date of Patent: Mar. 28, 2017

(54) ACCELERATION SENSITIVE INDICATOR

(71) Applicant: Roche Diagnostics Operations, Inc., Indianapolis, IN (US)

(72) Inventors: Geza Burghardt, Rotkreuz (CH); Michael Glauser, Adliswil (CH); Oliver Gutmann, Thalwil (CH); Daniel Mueller, Rotkreuz (CH); Edwin Oosterbroek, Cham (CH); Roger Sandoz, Rotkreuz (CH); Emad Sarofim, Hagendorn (CH); Goran Savatic, Kuessnacht am Rigi (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 284 days.

(21) Appl. No.: 14/286,194

(22) Filed: May 23, 2014

(65) Prior Publication Data

US 2014/0360269 A1    Dec. 11, 2014

(30) Foreign Application Priority Data

Jun. 6, 2013 (EP) .................................. 13170918

(51) Int. Cl.
     *G01N 21/75*      (2006.01)
     *G01P 15/02*      (2013.01)
     *B01L 3/00*      (2006.01)

(52) U.S. Cl.
     CPC .......... *G01P 15/02* (2013.01); *B01L 3/5021* (2013.01); *B01L 3/5453* (2013.01); (Continued)

(58) Field of Classification Search
     CPC ...... G01P 15/02; B01L 3/5453; B01L 3/5021; B01L 2300/021; B01L 2200/143; (Continued)

(56) References Cited

U.S. PATENT DOCUMENTS

| | | |
|---|---|---|
| 2009/0186341 A1 | 7/2009 | Dahm |
| 2011/0313684 A1* | 12/2011 | Furrer .................. B01L 3/5021 702/41 |

FOREIGN PATENT DOCUMENTS

EP      2397225 A2      12/2011

OTHER PUBLICATIONS

Kokuti, Z. et al., "Nonlinear Viscoelasticity and Thixotropy of a Silicone Fluid," Annals of Faculty Engineering Hunedoara—International Journal of Engineering, 2011, pp. 177-180.

* cited by examiner

*Primary Examiner* — Dennis M White
(74) *Attorney, Agent, or Firm* — Roche Diagnostics Operations, Inc.

(57) ABSTRACT

An acceleration sensitive indicator for indicating a centrifugation status of a biological sample, a sample container comprising the indicator, a centrifuge for centrifuging samples and an analytical system for analyzing centrifuged samples are disclosed. The indicator comprises at least one closed chamber, formed between two opposite surfaces, that comprises an indication zone that comprises at least two fluid transfer zones or at least one particle transfer zone. The at least one fluid transfer zone comprises a solid carrier phase and a fluid stabilized in the solid carrier phase or at least one non-stabilized non-Newtonian fluid having thixotropic and/or shear thinning properties. The at least one particle transfer zone comprises a particle stabilizing fluid comprising stabilized dispersed particles. The fluid or particles have a distribution with respect to the indication zone changeable upon application of a g-force above a threshold value, the change of distribution indicating the centrifugation status.

17 Claims, 14 Drawing Sheets

(52) U.S. Cl.
CPC ..... *B01L 2200/14* (2013.01); *B01L 2200/143* (2013.01); *B01L 2300/021* (2013.01); *B01L 2300/025* (2013.01); *B01L 2300/0663* (2013.01); *B01L 2400/0409* (2013.01)

(58) Field of Classification Search
CPC ....... B01L 2300/025; B01L 2400/0409; B01L 2300/0663; B01L 2200/14
See application file for complete search history.

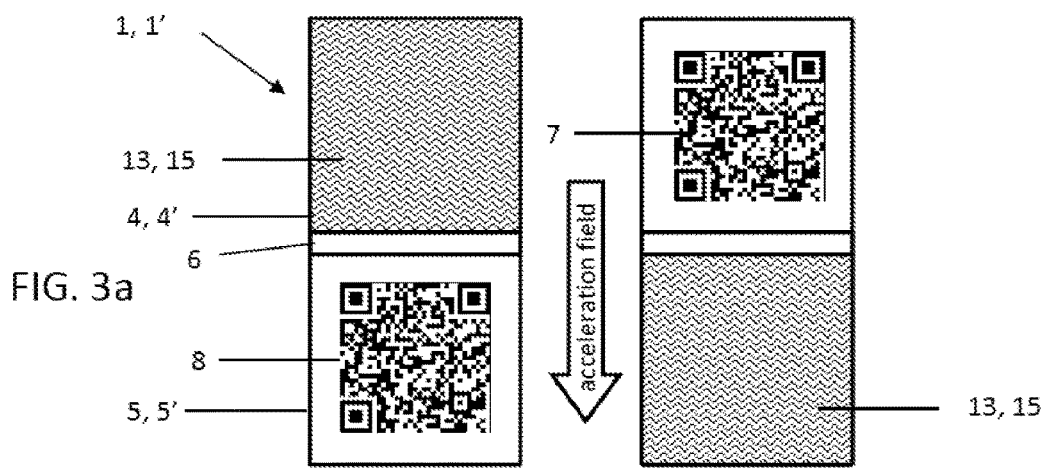
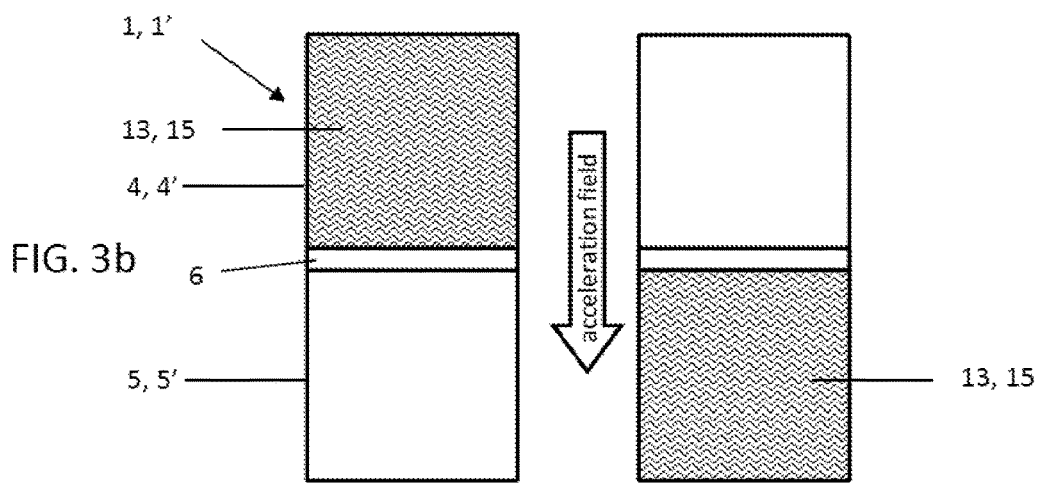
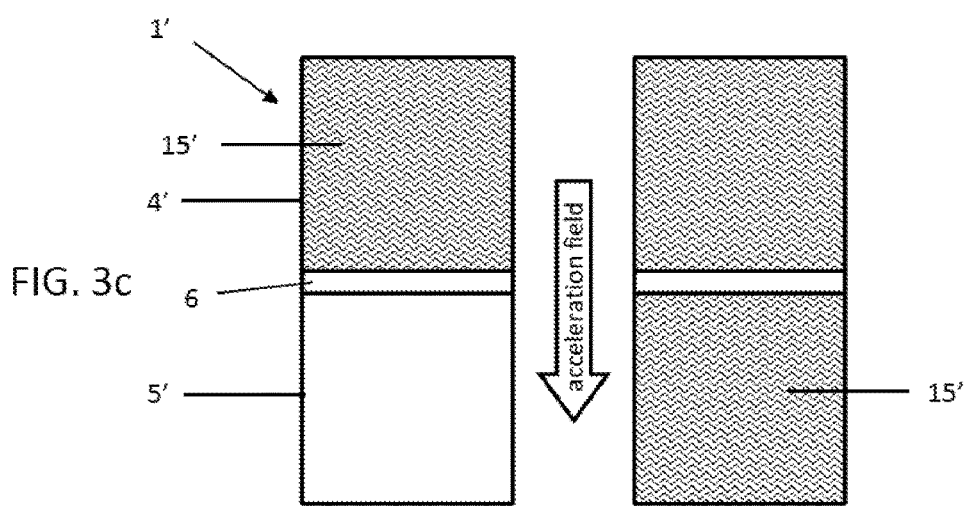

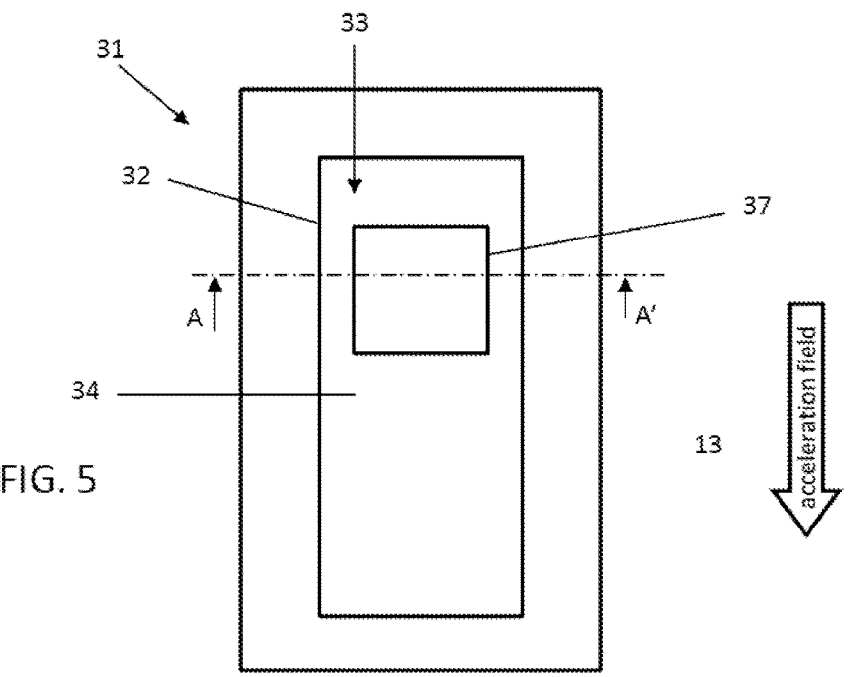
FIG. 5
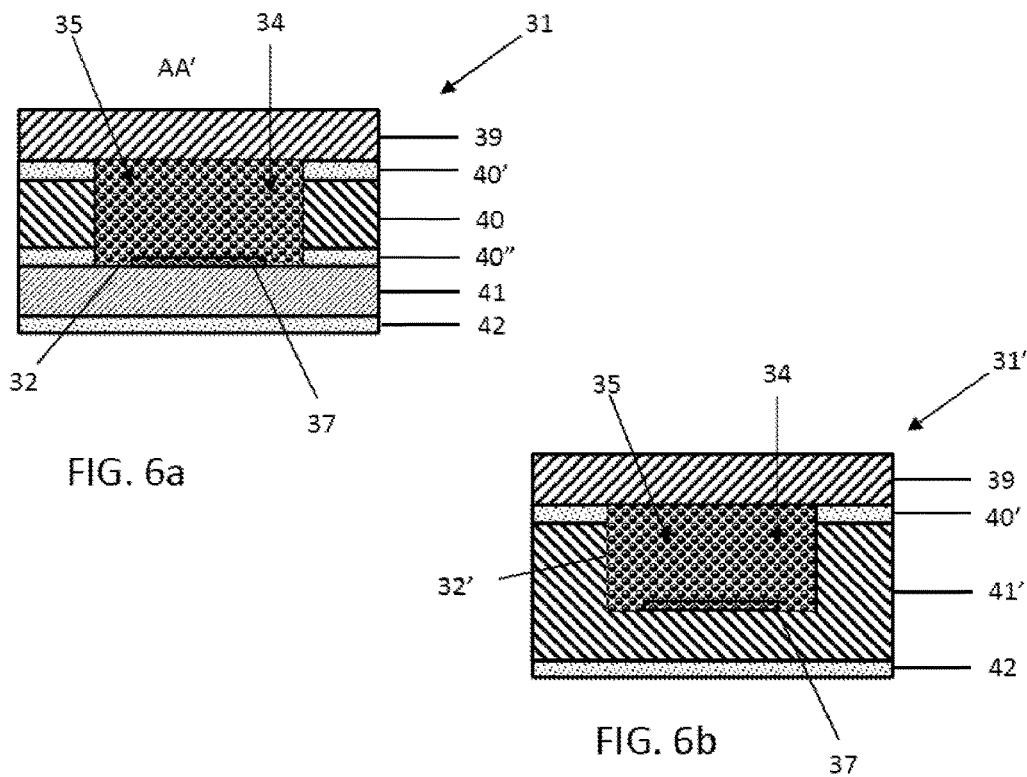
FIG. 6a
FIG. 6b

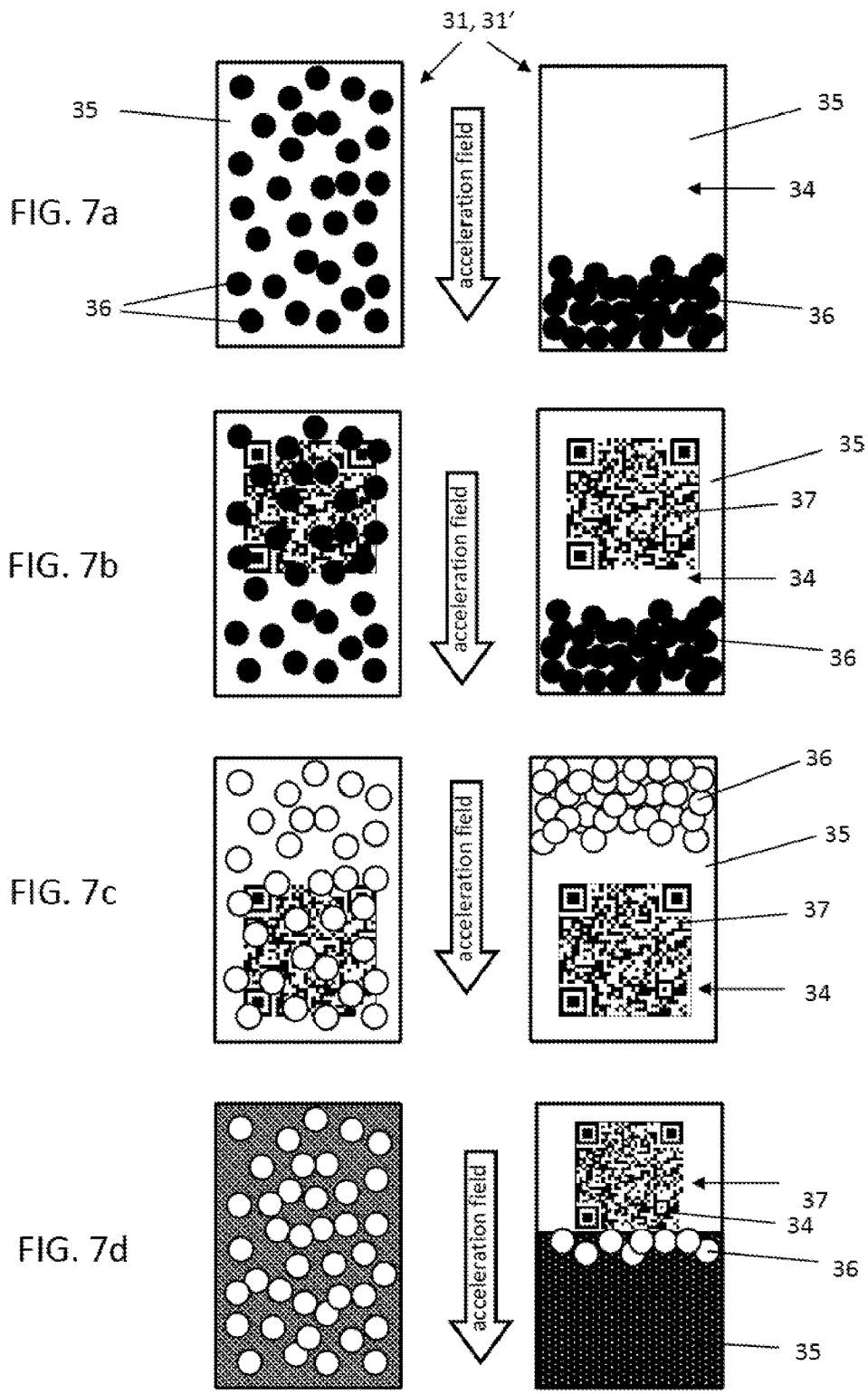

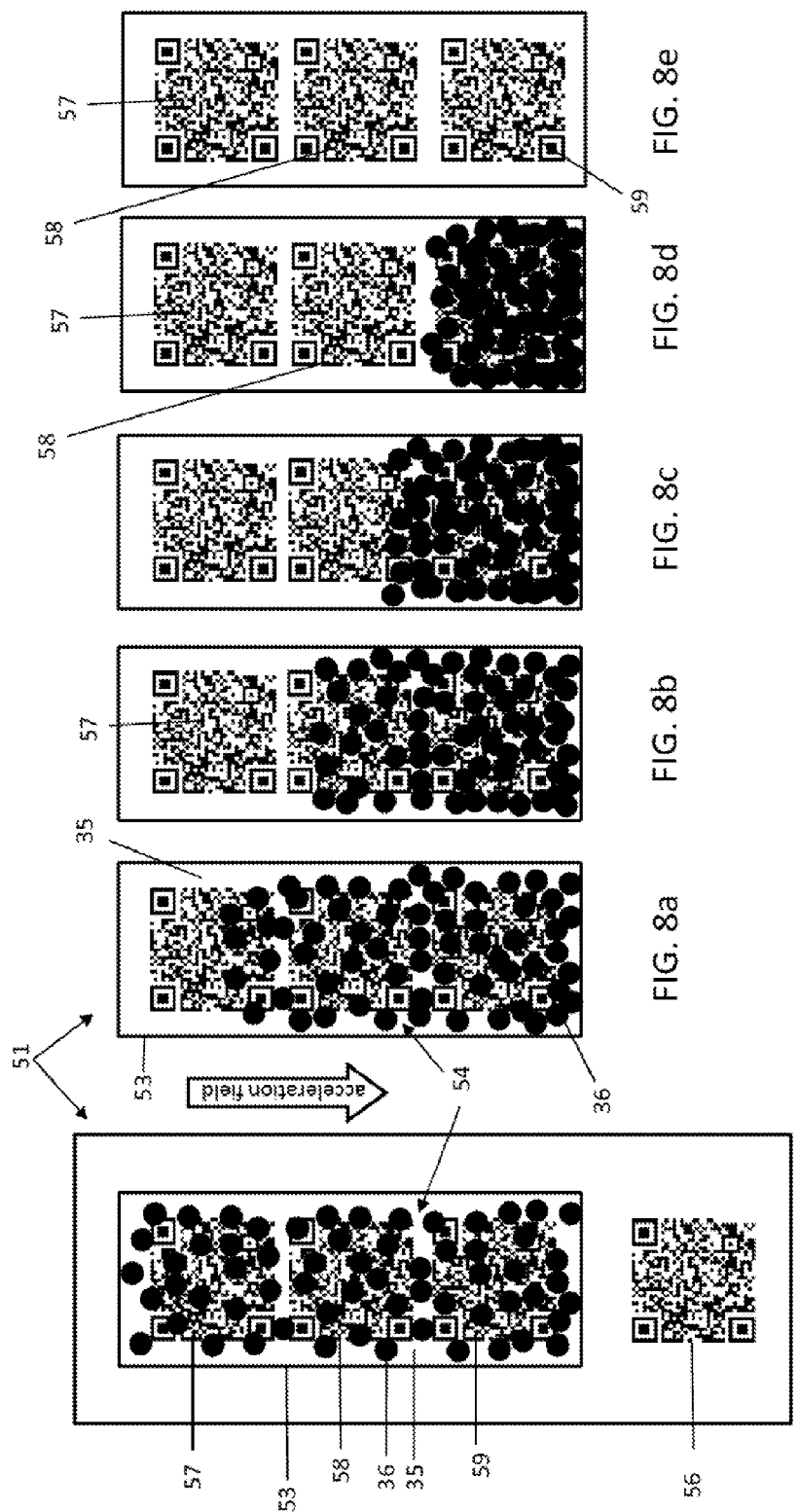

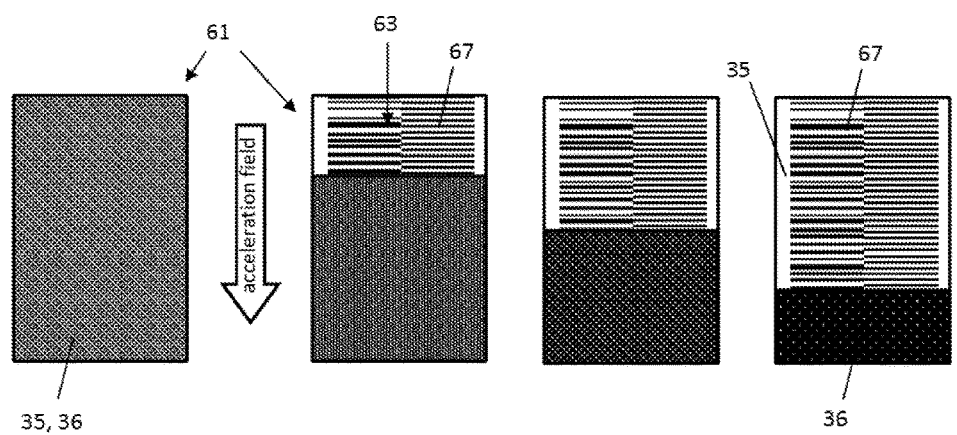
FIG. 9
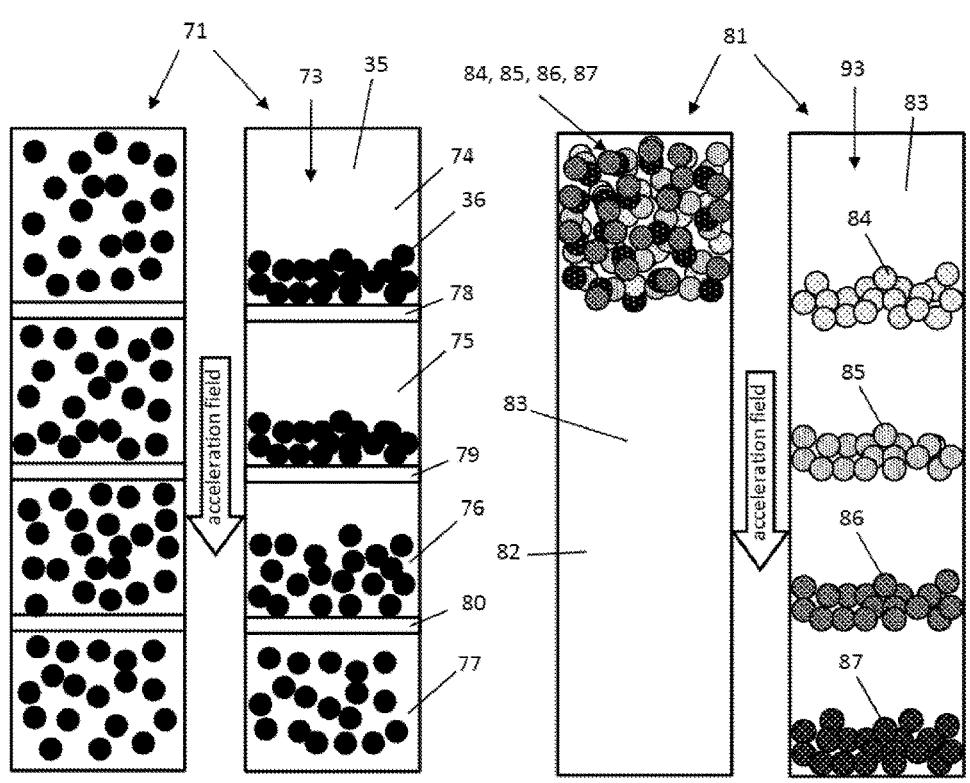
FIG. 10
FIG. 11

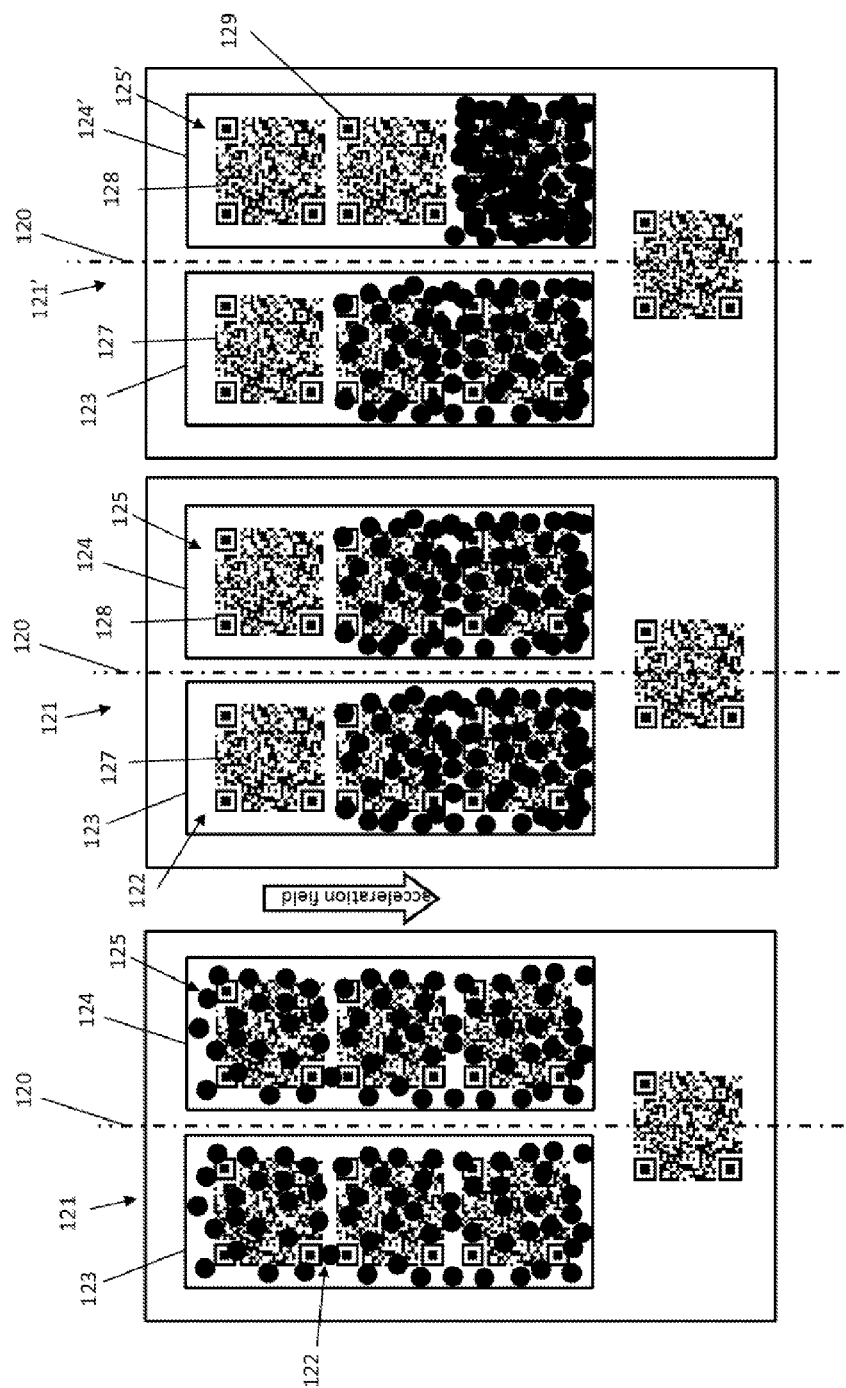

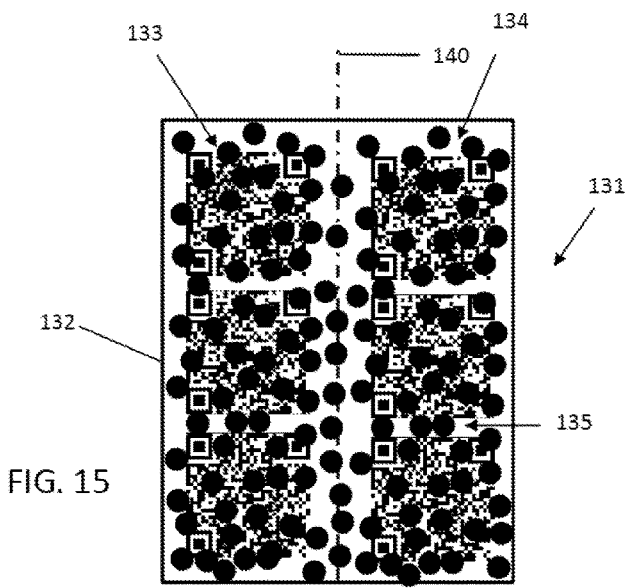
FIG. 15
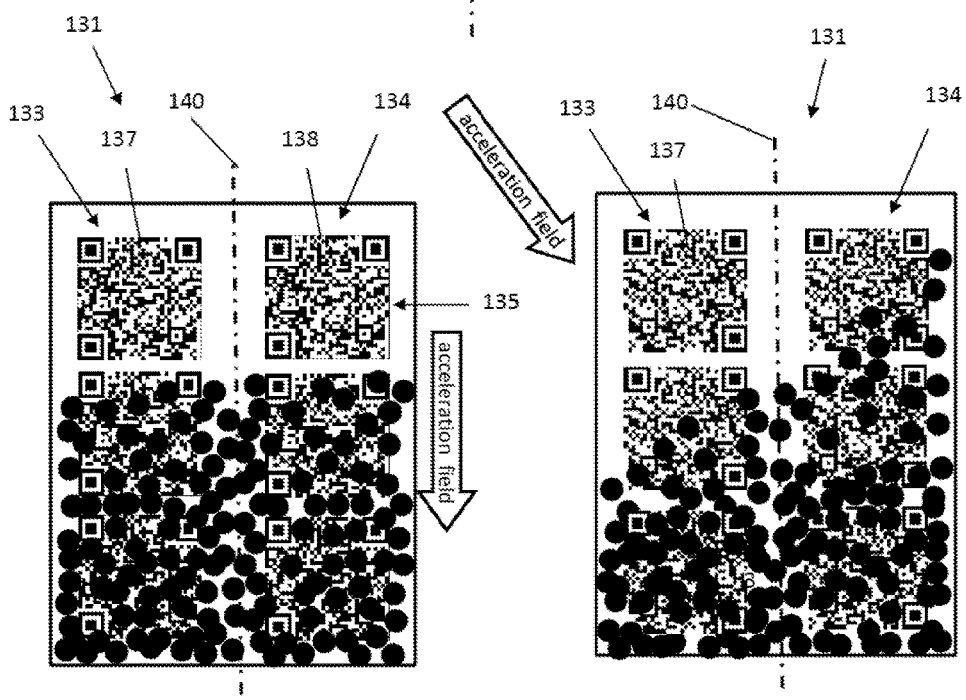
FIG. 15a
FIG. 15b

ACCELERATION SENSITIVE INDICATOR

CROSS-REFERENCE TO RELATED APPLICATIONS

This application claims priority to EP 13170918.0, filed Jun. 6, 2013, which is hereby incorporated by reference.

BACKGROUND

The present disclosure relates to an acceleration sensitive indicator for indicating the application of an acceleration field, a sample container comprising the indicator for centrifuging a biological sample contained therein, and an analytical system for determining the centrifugation status of the sample.

Proper analysis of a biological sample can depend on the centrifugation status of the biological sample, and thus it is often important to determine whether centrifugation to separate various sample constituents has already been accomplished or not. Not only can a lack of completed centrifugation affect the validity of an analytical test, but additional, unnecessary centrifugation applied to a sample may have a negative impact on the quality of an analysis performed on that sample. For example, many sample tubes used for preparing plasma or serum from whole blood samples comprise a gel for stably keeping the sediment (which can comprise sedimented cells, a particular sedimented cell fraction, a sedimented clot, and the like) separated from the serum or plasma after centrifugation. If one or more additional centrifugation steps are carried out on the already centrifuged sample, the gel barrier may be damaged, thereby allowing the sediment and serum or plasma to mix. Thus, it is important to be able to determine whether a sample, e.g. whole blood, which is not supposed to be centrifuged for certain types of diagnostic tests, has been accidentally centrifuged or whether a sample, e.g. plasma or serum, that is supposed to be obtained from whole blood under particular centrifugation conditions, has not been centrifuged at all or has been centrifuged under inappropriate centrifugation conditions.

Various approaches to automate the task of detecting whether a biological sample container has been centrifuged have been developed: in some laboratories, an Information Technology system ("IT system"), e.g., a LIS or laboratory middleware system, is used to control a laboratory workflow and keep track of the current centrifugation status of one or multiple biological samples. However, the amount and type of data managed by a laboratory's IT-system, varies between different laboratories. Many laboratories, in particular smaller ones, currently do not integrate data related to the centrifugation state of the samples.

In other laboratories, the centrifugation status is determined by visual inspection or using imaging-systems. Manual and image-system based approaches are both error prone. In the case of blood samples, for example, a slight separation effect can be observed when a biological sample is left to stand for one hour or longer. As a consequence, simple visual inspection and image-system based approaches in many cases will wrongly interpret this naturally occurring separation effect as the result of an applied centrifugation step. Since the upper part of a blood sample naturally becomes transparent upon sitting in an upright orientation, an optical detector cannot distinguish reliably between a properly centrifuged sample and a plasma sample with naturally occurring sedimentation.

Therefore, there is a need for an acceleration sensitive indicator that indicates whether a sample has been centrifuged as well as permits detection of centrifugation quality in order to enhance the reliability of diagnostic tests and that is simple, cost effective and provides enhanced stability of the readout after centrifugation, an internal quality control of the centrifugation status readout and a readout that discriminates between swing-type and fixed angle type centrifuges.

SUMMARY

According to the present disclosure, an sample container, a centrifuge and an analytical system that incorporates an acceleration sensitive indicator for indicating a centrifugation status of a biological sample are presented. The acceleration sensitive indicator can comprise at least one closed chamber formed between two opposite surfaces. The chamber can comprise at least one indication zone. The at least one indication zone can comprise at least two fluid transfer zones or at least one particle transfer zone. The at least one fluid transfer zone can comprise at least one solid carrier phase made of a porous adsorbing material and at least one fluid stabilized in the porous adsorbing material. A g-force above a threshold-value may be required in order for the at least one fluid to move out of the fluid transfer zone and to change distribution with respect to the at least one indication zone or at least one non-stabilized non-Newtonian fluid having thixotropic and/or shear thinning properties, wherein a shear stress induced by a g-force above a threshold-value, may be required in order for the non-Newtonian fluid to move out of the fluid transfer zone and to change distribution with respect to the at least one indication zone. The at least one particle transfer zone can comprise at least one particle stabilizing fluid comprising stabilized dispersed particles. The particle stabilizing fluid can have a particle stabilizing yield value which can allow the particles to be stabilized below a g-force threshold value and to change distribution with respect to the at least one indication zone only upon application of a g-force above a threshold value. The change of distribution of the at least one fluid or particles can indicate the centrifugation status.

Accordingly, it is a feature of the embodiments of the present disclosure to provide an acceleration sensitive indicator that indicates whether a sample has been centrifuged as well as permits detection of centrifugation quality in order to enhance the reliability of diagnostic tests and that is simple, cost effective and provides enhanced stability of the readout after centrifugation, an internal quality control of the centrifugation status readout and a readout that discriminates between swing-type and fixed angle type centrifuges. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 3a-c illustrate schematically some examples of how a change in fluid distribution can be detected according to an embodiment of the present disclosure.

FIG. 5 illustrates schematically another type of acceleration sensitive indicator based on particle transfer according to an embodiment of the present disclosure.

FIG. 6a illustrates a cross-section of the acceleration sensitive indicator of FIG. 5 according to an embodiment of the present disclosure.

FIG. 6b illustrates variant of the embodiment of FIG. 6a according to an embodiment of the present disclosure.

FIGS. 7a-d illustrate schematically some examples of how a change in particle distribution can be detected according to an embodiment of the present disclosure.

FIGS. 8 and 8a-e illustrate schematically an example of how a centrifugation status can be detected and quantified using particle transfer according to an embodiment of the present disclosure.

FIGS. 9-11 illustrate other examples of how the centrifugation status can be detected and quantified using particle transfer according to an embodiment of the present disclosure.

FIG. 13 illustrates schematically an acceleration sensitive indicator comprising two indication zones according to an embodiment of the present disclosure.

FIGS. 13a-b illustrate two variants of the acceleration sensitive indicator of FIG. 13 respectively according to an embodiment of the present disclosure.

FIG. 15 illustrates schematically an example of acceleration sensitive indicator to determine with which orientation a sample container was placed in an acceleration field according to an embodiment of the present disclosure.

FIGS. 15a-b illustrate schematically how the particle distribution of the acceleration sensitive indicator of FIG. 15 changes in an acceleration field according to FIGS. 14a-b respectively according to an embodiment of the present disclosure.

DETAILED DESCRIPTION

Figure 1:
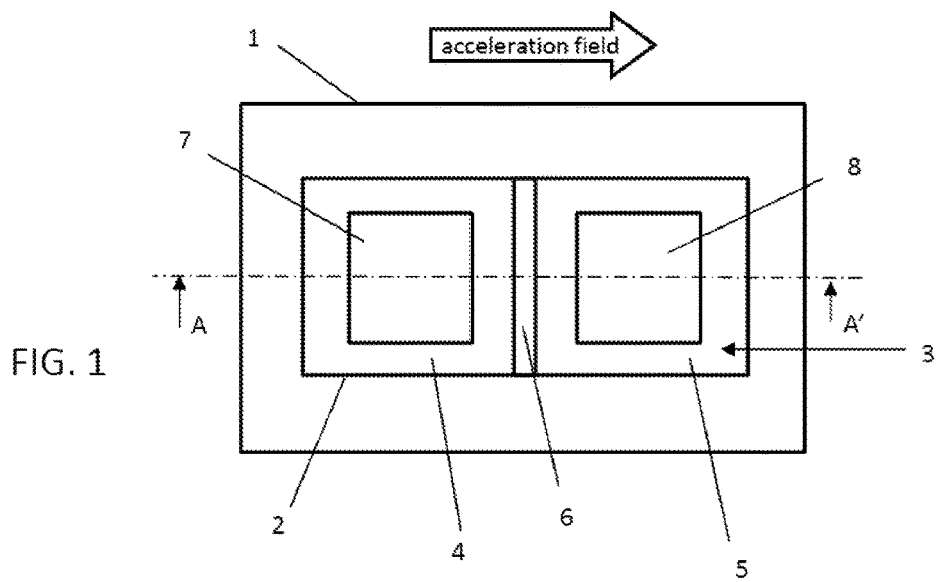
FIG. 1 illustrates schematically an acceleration sensitive indicator based on fluid transfer according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The terms "a," "an" and "the" can include both the singular and plural referents unless specifically stated otherwise. The term "comprises" can mean "includes." It is also noted that terms like "preferably," "commonly," "typical" or "typically" may not be utilized to limit the scope of the claimed embodiments or to imply that certain features are critical, essential, or even important to the structure or function of the claimed embodiments. Rather, these terms can merely be intended to highlight alternative or additional features that may or may not be utilized in a particular embodiment of the present disclosure.

The term "acceleration" as used in the following can refer to any acceleration field, for example, a centrifugal field, to which the indicator and more in general any object such as a sample container comprising the indicator may be subjected. A "centrifugal field" can thus be a particular form of acceleration field, obtained by rotation of an object in a circular path about a rotational axis. An object subjected to an acceleration field such as a centrifugal field can be subjected to a g-force. A g-force F caused by accelerating an object of mass m by an acceleration a is calculated as F=m×a. The gravitational force acting on objects in free fall in the direction of the earth's center, which is caused by the gravitational attraction between the mass of the earth and the mass of the object, is referred to as "g-force of 1 g." In a centrifugal field, the higher the centrifugation speed, usually measured in rotations per minute (rpm) or in meters per second (mps), the higher is the g-force can be applied to the object. The unit rpm or mps indicates the number of turns that a centrifuge performs per unit of time, e.g. within a minute or within a second. The magnitude of the g-force or centrifugal force F is given by the formula $F=m \times v^2/r$, where m is the mass of the object [kg], v is the speed of the object [meter per second], and r is the distance [meter] of the object from the centrifugation axis. In the following, any kind of force resulting from accelerating an object in acceleration field, for example, a centrifugal force resulting from centrifugation of the object, will be referred to as "g-force" irrespective of the measurement unit used and acceleration field. For example, a g-force above 100 g, (g-force 100 times higher than the force caused by the earth's gravity acceleration) can be typically suitable for centrifuging biological samples. A g-force value about 500 g or higher can be, for example, considered appropriate for satisfactory separation of the sediment "cell fraction" and "plasma", as well as for separation of the sediment "clot" and "serum" when centrifuging blood samples. The application of higher g-forces can typically require shorter centrifugation times whereas the application of lower g-forces can typically require longer application times. Thus similar centrifugation results can be obtained with different combinations of g-forces and centrifugation times (the length of time that a g-force is applied). The maximum g-force that can be applied depends on the technical properties of the centrifuge used as well as on the type of container and sample used. For example, centrifugation quality for particular samples and/or applications may require not to exceed a certain g-force and/or a certain centrifugation time. A practical range of g-forces for biological samples can be mostly comprised between about 300 g and about 4000 g where the centrifugation time can range from a few seconds to several minutes, for example, between about 30 seconds and about 30 minutes.

An acceleration sensitive "indicator" can be a device comprising at least one acceleration indication zone which can be insensitive to g-forces below a threshold value, for example, a g-force of 1 g or shocks caused by short powerful acceleration pulses, and which can be sensitive to g-forces above a threshold value. In addition, a g-force above a threshold value may have to be applied for a prolonged time. The threshold value may vary between different indication zones of the same indicator or between different indicators and/or between subzones of the same indication zone according to the desired application. The term "sensitive" can mean that the indicator undergoes a durable physical change, which can be detectable and can indicate that centrifugation at a g-force above the threshold value has occurred. "Durable" can mean for a period of time at least as long as the time for which a sample in the sample container may be reused. According to one embodiment, durable can mean permanent at least under stationary storage conditions.

In one embodiment, the disclosed acceleration sensitive indicator can comprise at least one closed chamber formed between two opposite surfaces. The chamber can include an inner space and at least one indication zone. An "indication zone" can be a zone of the chamber occupying a space equal or smaller than the inner space of the chamber that can be covered at least in part by materials or substances whose physical properties measurably change in proportion to the application of a g-force above a threshold value and eventually to the duration of the application.

In one embodiment, the indication zone may be of two types. A first type of indication zone can be based on a fluid transfer principle and can include two subtypes. A first subtype can include a solid carrier phase and a fluid stabilized in the solid carrier phase. A second subtype can include a non-Newtonian fluid which can be stabilized by its inherent properties and may not therefore require a solid carrier phase to be stabilized. In order to distinguish the fluids used in the two subtypes, the fluid used in the first subtype is referred to as "stabilized fluid" and the fluid used in the second subtype is referred to as "non-stabilized fluid". A non-stabilized fluid may be used also with the first subtype. A second type of indication zone can be based on a particle transfer principle. Both types of indication zones and the meaning of the terms used are described in more detail in the following.

An indication zone based on a fluid transfer principle can comprise a plurality of fluid transfer zones, for example, at least two fluid transfer zones. A "fluid transfer zone" can be a zone of the indication zone occupying a space smaller than the inner space of the indication zone which can comprise and confine a predefined volume of fluid and/or can receive and confine fluid from another fluid transfer zone of the same indication zone.

In a first subtype, the fluid transfer zone can include at least one solid carrier phase and at least one fluid stabilized in the solid carrier phase. A "solid carrier phase" can be a fixed porous medium having fluid retaining properties which can exercise a stabilizing effect on the fluid, for example, by surface tension and flow resistance of the porous medium, referred to as a "stabilizing force." The term "fixed" can mean that the carrier phase can remain at the same position during centrifugation, whereas the fluid dispersed within can flow out of the porous medium when a g-force exceeding the stabilizing force is applied to the indicator. The term "stabilized" can mean that the fluid can remain in the solid carrier phase until a g-force above a threshold value can overcome the stabilizing force.

The solid carrier phase may be, for example, a natural or synthetic membrane or filter material, forming a porous 3D network of fibers and arranged, for example, as a flat and confined pad in the chamber. Alternatively, the carrier phase may be arranged as a confined region packed with liquid adsorbing or absorbing, and hence retaining, material. In general, the carrier phase may be any type of chromatographic porous material having e.g. hydrophobic or hydrophilic properties and may comprise ion exchange or affinity groups. The fluid stabilized by the solid carrier phase may be any Newtonian or non-Newtonian fluid such as, for example, a polar, for example, aqueous, or non-polar, e.g. organic liquid or viscous fluid having a surface affinity to the carrier phase. Particular examples of fluids that may be used include water, glycerin, mineral oil, and the like, to which a colored substance such as a dye can be added to aid in visualization of movement of the liquid within the disclosed indicator.

In a second subtype, the fluid transfer zone can comprise at least one non-stabilized fluid. The term "non-stabilized" can mean that the fluid can be retained in the fluid transfer zone without the need of a solid-carrier phase but rather by the inherent properties of the fluid itself. A shear stress induced by a g-force above a threshold-value can be required in order for the fluid to move out of the fluid transfer zone. Non-Newtonian fluids having an apparent viscosity which decreases with duration of stress (thixotropic) and/or which decreases with increased stress (shear thinning) may be used as non-stabilized fluids. For example, the non-Newtonian fluid can be a plastic or pseudoplastic fluid. Particular examples of such fluids are paints, inks (such as the ink used for ballpoint pens), some clays like bentonite, some gels like pectin gels and gelatin gels, some oils like silicon oil, some glues and slurries, and the like.

For both subtypes, the at least one stabilized or non-stabilized fluid can have a distribution with respect to the indication zone, which can change only upon application of a g-force above a threshold value, the change of distribution reflecting a centrifugation status. Changing the distribution with respect to the indication zone can mean that a stabilized fluid or a non-stabilized fluid moves, i.e. can be transferred, at least in part, from a source fluid transfer zone into a receiver fluid transfer zone, in a manner that can be detectable. A receiver fluid transfer zone may be empty or may contain a fluid that can be replaced by or mixed with the fluid received from the source fluid transfer zone. According to some embodiments, the fluid can be transferred a plurality of times from fluid transfer zone to fluid transfer zone. Thus, a particular transfer zone can in some embodiments be both a receiver fluid transfer zone and a source fluid transfer zone for a second receiver fluid transfer zone. A g-force of 1 g which may act in any direction for a long storage time, as well as shocks by short powerful acceleration pulses may not be sufficient to transfer the fluid out of the fluid transfer zone. For a change of distribution to occur, a g-force above a threshold value has to be applied for a certain time.

In the case of a stabilized fluid, when the indicator can be subjected to a g-force that can have a value above the stabilizing force of the carrier phase, the fluid can start to flow through the porous medium. Short, powerful pulses may cause small, short movements of the fluid, after which the fluid can again be stabilized. When a certain g-force threshold is exceeded, the fluid can start to move in the direction of the acceleration field. Analogously, in case of a thixotropic and/or shear thinning non-stabilized fluid, only when a certain g-force threshold is exceeded, the fluid viscosity can decrease and the fluid can start to move in the direction of the acceleration field.

This movement may be detected in different ways as indication of the centrifugation status. For example, an optical change, for example, caused by a color change or change of color intensity may be observed due to the transfer of a fluid between fluid transfer zones. A pattern, like a code may become visible when a fluid, which can cover the pattern can be drained from the fluid transfer zone and/or when the fluid is transferred into another fluid transfer zone. The carrier phase itself or a surface of the chamber, specifically of the fluid transfer zone may be patterned, wherein covering the patterned zone with the fluid or draining the fluid from the patterned zone can reveal or hide the pattern. The indication pattern may be designed, for example, as a barcode, a 2D code, an alpha-numeric symbol, which may be human and/or machine readable.

According to certain embodiments, the at least one fluid can comprise a dye and/or can be colored. A "dye" can be a colored substance, e.g. an organic or inorganic composition or conjugate, either natural or synthetic, which can be soluble in the fluid used and can be dissolved in the fluid. The dye may or may not have affinity to the carrier phase. "Colored" can mean that it can absorb and/or emit light in a detectable manner, not necessarily in the visible range. According to one embodiment, the dye can be fluorescent. According to certain embodiments, the at least one dye can be adsorbable or absorbed by the porous solid carrier phase such as to remain adsorbed or absorbed to/in at least a part of the solid porous material of a fluid transfer zone when the fluid in which it can be suspended or dissolved can be transferred.

According to certain embodiments, the indication zone can comprise a fluid barrier between adjacent fluid transfer zones. The at least one fluid can be transferable at least in part between the fluid transfer zones via the fluid barrier only upon application of a g-force above the threshold value.

A "fluid barrier" can be a delimiting or separating region between fluid transfer zones which can enhance stability of the indicator before and after centrifugation. In one embodiment, a fluid barrier can ensure that a change of distribution of the fluid caused by an acceleration force over time can be maintained after centrifugation and that the centrifugation status can be determined or checked regardless of the time elapsed after centrifugation. A fluid barrier can also reduce the risk that distribution of the at least one fluid can accidentally be changed before centrifugation, e.g. during storage and transport conditions. The fluid barrier may be a material comprising modified properties such as enhanced flow resistance and surface tension, e.g. higher hydrophobicity or different porosity, with respect to the fluid transfer zones, for example, with respect to the porous solid carrier phase of a fluid transfer zone. In this manner, the fluid, once transferred past the fluid barrier, cannot flow backwards at least under storage conditions. A gap, i.e. an empty space between different fluid transfer zones may also act as a fluid barrier, e.g. if the surface is hydrophobic and the fluid to be transferred is hydrophilic.

Other methods of enhancing stability may be used in addition or in alternative. If a dye is absorbable to the solid carrier phase for example or if a mordant is used, adsorption of the dye by the carrier phase may for example permanently hide or reveal a pattern. Also when a fluid is transferred to a different fluid transfer zone, reaction of the fluid or dye contained therein with another fluid or carrier phase may cause an irreversible color change or other visual effect. According to certain embodiments, at least one fluid transfer zone can include at least one fluid, which can be replaceable at least in part by at least another fluid of a different color and/or different opacity from another fluid transfer zone.

An indication zone based on a particle transfer principle can comprise at least one particle transfer zone. A "particle transfer zone" can be a zone of the indication zone occupying a space equal to or smaller than the inner space of the indication zone, which can comprise and confine a predefined volume of at least one particle stabilizing fluid comprising stabilized dispersed particles. The particles can have a distribution with respect to the indication zone, which can be changeable only upon application of a g-force above a threshold value, the change of distribution providing an indication of centrifugation status. In one embodiment, a "particle stabilizing fluid" can be a thickened medium having a "particle stabilizing yield value", which can allow particles to be stably trapped until subjected to a g-force above a threshold value. Forces above the threshold g-value can cause particles to migrate with respect to the thickened medium. Thus, a g-force of 1 g which may act in any direction for a long storage time, as well as shocks by short powerful acceleration pulses, cannot be sufficient to change the distribution of the particles with respect to the fluid, and therefore with respect to the indication zone. The particle stabilizing yield value may depend on particle properties such as size, density, surface interaction, concentration (expressed as the number of particles per volume of fluid or as weight/weight). Thus a certain particle stabilizing yield value may be the result of a specific combination of the specific particle stabilizing fluid and specific particles used. In one embodiment, the fluid and the particles can be chosen such that only when the particle stabilizing yield value is overcome by a g-force above a threshold value, do the particles start to move and to change distribution within the fluid, whereas the fluid can remain stationary in the particle transfer zone.

According to certain embodiments, the particle stabilizing fluid can be a plastic fluid, a hydrogel, an organogel or combinations thereof, and can have a particle stabilizing yield value, which can be overcome only at a g-force above a threshold value. The plastic fluid may be a Bingham or non-Bingham plastic fluid.

In general, the term "plastic fluid" can be used to indicate a viscoplastic material that can behave as a rigid body at lower shear stresses but can flow as a viscous fluid at higher shear stress. In particular, a plastic fluid can show an extreme non-linear fluid flow behavior, i.e. a drastic (exponential) increase of viscosity in low shear stress conditions (below a certain threshold value). The fluid flow behavior of a plastic fluid in this low shear stress range can therefore be approximated in practice to a shear-stress offset, only above which any fluid flow can become noticeable. The shear stress "offset" can also be indicated by the term "shear stress yield value."

In order to make the fluid remain stationary, the fluid may be confined in a closed space. Alternatively, a fluid with a shear stress yield value higher than the particle stabilizing yield value may be chosen. In this case, a g-force between a first threshold value and a second threshold value can be chosen such that only the particles can move with respect to the fluid. According to another embodiment, the acceleration sensitive indicator can comprise an indication zone with at least one particle transfer zone, which can also be a fluid transfer zone. In this case, by using a g-force only above a first threshold value, only the particles can move with respect to the fluid and by using a g-force above a second threshold value also the fluid can move. By selecting the proper threshold values, a precise acceleration sensitive indicator can thus be obtained, in order e.g. to make sure that the correct g-force is used.

Other examples of particle stabilizing fluids can be gels like agarose, cellulose, polyacrylate, polyacrylamide gels, lecithin, polyethylene gel, sticky low adhesion force glues, silicone gel, and the like. According to an embodiment, the particle stabilizing fluid can be the same gel type used as a separation gel in some blood primary tubes for maintaining the separation of plasma or serum from the cellular component of blood after centrifugation. Combinations of different types of particle stabilizing fluids may also be used. According to some embodiments, the particle stabilizing fluid can be a non cross-linked gel. According to other embodiments, the particle stabilizing fluid can be a gel that is polymerized, where polymerization can include linear polymerization or cross-linked polymerization, before or after being placed in the chamber. For ease of handling, especially in case of cross-linking, it may be convenient to start with a monomeric solution comprising dispersed particles and to mix the solution with an initiator of polymerization just before being placed in the chamber so that a polymeric gel comprising the stabilized particles trapped therein can be formed in the chamber. The particle stabilizing fluid may also comprise a dye and/or be colored analogously to a stabilized or non-stabilized fluid as described above.

The particles dispersed in a particle stabilizing fluid may be any corpuscular matter whose change of distribution in the particle stabilizing fluid can be detectable. This can include natural particles, synthetic particles, and also, for example, air bubbles or any dispersed material whose change of distribution can be directly or indirectly detectable, e.g. by making a hidden sign detectable. Some examples of particles can be metallic particles, ceramic particles, glass particles, mineral particles, polymeric particles, air bubbles, and combinations thereof. The particles may have an average diameter of, for example, less than about 1 millimeter, for example, less than about 200 micrometer. The trapping mechanism by which particles can beheld in a particle stabilizing fluid can be based on a combination of several parameters, including porosity and cohesion of a three-dimensional network of the particle stabilizing fluid versus particle shape and size, depending e.g. on a linear or cross-linked nature of a gel and degree of cross-linking, motion resistance due to viscoelastic or plastic nature of the fluid, and surface tension.

The particles dispersed in a particle stabilizing fluid can have a distribution with respect to an indication zone, which can change only upon application of a g-force above a threshold value, the change of distribution indicating the centrifugation status. In one embodiment, when a certain g-force threshold is exceeded, the particles can start to move within the particle stabilizing fluid in the direction of the acceleration field or in the opposite direction (e.g. in case of particles having a density lower than the particle stabilizing fluid, such as air bubbles), the distance of migration depending on the period of time the g-force can be applied. The value of the g-force as well as the time needed to obtain a desired particle distribution can depend on the particular properties of the particles and of the particle stabilizing fluid, and may be adapted by making an appropriate selection, for example by choosing the type of particles with the desired properties, like material, size, shape, density, surface tension, as well as the particle stabilizing fluid with the desired properties, like sieving properties and flow resistance, which can be related to the particle stabilizing yield value.

A practicable particle size range, which can take e.g. into account the dimensions, and in one embodiment, the thickness of an acceleration sensitive indicator and the typical chamber volumes, can be in the range from a few nanometers to several hundred nanometers up to a few micrometers, for example, up to approximately 10-15 micrometers. A typical particle density range can be below about 10 g/cm$^3$, and can be typically higher than the density of the particle stabilizing fluid. Examples of particles that may be used are BaTiO3 (Barium Titanium Oxide) particles in the range of about 100 nanometers up to about 3 micrometers and a density of about 5.85 g/cm$^3$ or Al2O3 (Aluminum Oxide) particles in the range of about 3 micrometers to about 15 micrometers and a density of about 3.95 g/cm$^3$ The particle density may be however lower than the density of the particle stabilizing fluid, e.g. in case of air bubbles, as already noted. The particles may be chosen also according to their surface properties, e.g. in terms of chemical affinity to the particle stabilizing fluid. In general, larger sizes, smaller differences between particle density and particle stabilizing fluid density, higher chemical affinity, higher sieving properties and higher flow resistance of the particle stabilizing fluid, can mean a higher particle stabilizing yield value and therefore a higher g-force threshold value.

Appropriate combinations of particles and particle stabilizing fluids can be determined for example by subjecting a mixture to an acceleration force (such as in a test tube) and observing the time progress of the particle flow during centrifugation. Appropriate combinations can be those providing measurable results in the range of g-forces comprised between about 300 g and about 4000 g over a centrifugation time comprised between about 30 seconds and about 30 minutes as mentioned above.

According to other embodiments, the particles in a particle transfer zone can be deformable upon application of a g-force above the threshold value. This may further enhance stability of the indicator after centrifugation.

The change of distribution of a fluid or of particles can be directly related to a centrifugation status. In one embodiment, not only a qualitative (indication whether centrifugation has occurred or not) but also a quantitative centrifugation status can be obtained. Quantification can, for example, be based on the location or a measurement of the migration path of a fluid or particles. The longer the centrifugation time, the longer the migration path can be. A scale or a series of signs or codes (e.g. barcodes) arranged for example in a linear manner, may be used to indicate the length of migration. In one embodiment, the migration path can be checked by checking at different positions along the indication zone whether a position has been reached by the particles. It can thus be possible to indicate not only that a particular g-force above a threshold value has been applied at least once, but the indicator may further indicate the approximate strength of the applied g-force and/or the approximate time during which a g-force above a threshold value acted on the acceleration sensitive indicator. This information may help to determine whether a centrifugation step was performed incorrectly, e.g. aborted or interrupted or whether the duration of the centrifugation step was too short or the applied g-force inappropriate, e.g. too strong or too weak. This information can be valuable to lab and/or medical personnel and can be used by analytical systems to verify the correctness of centrifugation settings and/or to identify the samples that have been correctly centrifuged before analysis of the samples is initiated.

According to some embodiments, an indication zone can comprise a plurality of particle transfer zones. Adjacent particle transfer zones may be separated by a particle barrier arranged linearly at regular or irregular intervals. A "particle barrier" can be a partition against which particles can be accumulated upon application of a g-force above a threshold value and through which the particles cannot pass. Stacking of particles against a particle barrier may enhance detectability of particle re-distribution, as they can appear visible as bands. Particle gates may otherwise be used, which allow passage of the particles, e.g. upon application of a higher g-force or of the same g-force for a longer period of time. A particle gate may comprise a geometrically defined structure, which can allow passage of the particles only in one direction, i.e. in the direction of the acceleration field in order to enhance stability of the indicator.

According to some embodiments, a particle transfer zone may comprise a solid carrier phase in which the particle stabilizing fluid can be stabilized. The solid carrier phase may comprise a geometrically defined structure, which can allow passage of the particles only in one direction, i.e. in the direction of the acceleration field.

Different particle transfer zones in the indication zone may comprise particle stabilizing fluids with dispersed particles and without particles respectively or with different particles or different concentration of particles and/or may comprise different particle carrier fluids, wherein the particles can be transferrable between particle transfer zones only upon application of a g-force above a threshold value. The threshold values can be the same or different for different particle transfer zones. So, particles may be transferred in absence of a particle barrier or in presence of a particle gate to the next particle transfer zone in the direction of the acceleration field upon application of a higher g-force or upon application of the same g-force for a longer period of time for example. This may enhance the detectability of the change of particle distribution as well as provide an even more detailed and quantitative detection of the centrifugation status, by confining the particles in specific zones, which refer to specific centrifugation statuses.

Analogously, the at least one indication zone may comprise several fluid transfer zones with different g-force threshold values, so that a fluid may be transferred to the next fluid transfer zone in the direction of the acceleration field upon application of a higher g-force or upon application of the same g-force for a longer time for example. Alternatively, or in addition, different fluid barriers may be used that are arranged in a series such that successive fluid barriers can require increasing g-force in the direction of centrifugation in order for the fluid to pass to the next fluid transfer zone.

According to some embodiments, the g-force sensitive indicator can comprise at least two indication zones that are different from each other, wherein the at least one fluid or particles can have a distribution with respect to the respective indication zone that can be changeable only upon application of a g-force above a threshold value, but which can be different for the at least two indication zones.

According to other embodiments, an indication zone can include a code, which can become distinguishable (or indistinguishable) from a background or can otherwise be altered upon changing the distribution one of a fluid or particles in response to an acceleration force. The code may, for example, be a one-dimensional (1D) code, a two-dimensional (2D) code, an alpha-numeric code or combinations thereof. The code can be machine readable to facilitate automation of reading of the g-force sensitive indicator.

According to some embodiments, the code that can be displayed upon applying a g-force above a threshold value on the acceleration sensitive indicator may encode additional data such as the sample container type, the sample type, sample identifier, and the like.

According to some embodiments, the acceleration sensitive indicator may further comprise a non-acceleration sensitive indication zone, i.e. a zone which can be displayed irrespective of the application of a g-force, and can be used to indicate additional environmental conditions possibly affecting the quality of an analysis such as storage temperature, centrifugation temperature, and the like. Alternatively, further properties of the sample or the sample tube such as the tube type, sample type, sample identifier, patient related data, date, and the like can be included in the non-acceleration sensitive zone of the indicator. In this case, the information displayed may not depend on the application of a g-force and can be displayed permanently, for example, in the form of a second 1D, 2D, or alpha-numeric code.

The disclosed acceleration sensitive indicator may be easily manufactured by using low cost materials and simple manufacturing steps, regardless of the type of indication zone used.

According to some embodiments, the acceleration sensitive indicator can comprise a cover layer, a backing layer and at least one spacer layer between the cover layer and the backing layer forming the at least one closed chamber comprising the at least one indication zone. The chamber can be at least fluid tight. The chamber can be gas tight or gas permeable. According to one embodiment, the layers can be made of plastic foils and/or of a material which can be chemically inert or minimally interferes with the fluid or particles therein yet can have minimal or no permeability with respect to the fluid or particles. A coating may be used to enhance these properties. The cover layer may be made from a transparent material. Alternatively the cover layer may be made of an opaque material with a transparent window. According to one embodiment, the cover layer can be made of a material which can be scratch resistant or can comprise a scratch resistant coating to help ensure continued proper reading of the centrifugation status. The stiffer the cover film material the better the protection against mechanical impacts on the fluid and fluid reservoir can be (e.g. touching by user or centrifugal forces resulting in warped reservoir geometry). According to one embodiment, the spacer layer can be made from an opaque material to allow easier alignment to the backing layer during manufacturing. According to one embodiment, the backing layer can be made from a material compatible with e.g. barcode printing and having a color, e.g. white, which can provide sufficient contrast for reading. According to one embodiment, the backing layer can comprise an adhesive film, used to attach the indicator to a surface, e.g. of sample container. The adhesive side can be covered by a release liner. The acceleration sensitive indicator may thus be embodied as an adhesive label. The layers can typically be flexible films for easier attachment. A thin label can adhere better on a curved surface than a thicker one because of the mechanical bending force of the label versus the bond strength between the label and the surface. Typically the total thickness of the indicator can be below about 300 microns. The thickness of the spacer layer can be in a range of about 50 to about 150 microns. This thickness can provide the indicator with sufficient flexibility and stiffness and can also prevent possible fitting problems of a sample container carrying the label into commercial centrifuges. The layers can be laminated by a variety of methods, including laser welding, hot plate welding, ultrasonic welding, solvent assisted bonding, adhesive bonding (e.g. pressure sensitive adhesives). Some lamination methods may be more suitable than others in order to confer desired fluid/gas tight properties and thereby preventing fluid from leaking and/or evaporating. The desired shape/contour of the indicator and the shape of the chamber can be formed by a variety of methods, including laser cutting, water jet cutting, sawing, cutting with blades or knifes, etching.

The shape/contour of the indicator may be designed such that it can serve as guidance for placing the label onto the blood collection tube in the case the label can be applied manually. Alternatively, a visual mark like an arrow or a text on the label or on the tube can serve as guidance.

According to another embodiment, the indicator can be formed by lamination of only two layers wherein the at least one chamber can either be formed in the backing layer or in the cover layer. Depending on the substrate material, the chamber can be formed by a variety of methods, including hot embossing, thermoforming, plasma etching, laser machining, etching, lithography and the like.

According to another embodiment, the chamber can be formed between a cover layer and a cavity formed on a surface of a sample container. The cavity may be formed into a wall of the sample container or into a wall of a cap of the sample container, e.g. during a sample container/cap molding process or after the molding process in a subsequent process step such as one of the above described chamber forming methods, but not limited thereto. In one embodiment, after inserting the indication zone forming material, e.g. solid carrier phase, stabilized fluid, non-stabilized fluid, particle stabilizing fluid into the chamber, the chamber can be sealed with the cover layer, e.g. with one of the lamination methods listed above, but not limited thereto. In this case, the acceleration sensitive indicator can be an integrated part of the sample container rather than a label attached to the sample container. A chamber formed in a wall of the sample container can also have the advantage of minimizing or eliminating an increase in diameter or thickness of the sample container due to the thickness of the acceleration sensitive indicator and therefore to prevent possible problems of fitting of a sample container carrying an acceleration sensitive indicator in buckets of commercially available centrifuges.

A cavity formed in a sample container wall can alternatively serve as guidance for the correct positioning and attachment of an acceleration sensitive indicator of the label type.

According to another embodiment, which can be suitable for acceleration sensitive indicators based on the particle transfer principle, the indicator can be manufactured by filling a flexible hose or tubing with a gel-particle mixture, i.e. with a particle stabilizing fluid comprising dispersed particles. Aliquots can then be created by welding the tube material at regular distances. Segments containing gel-particle aliquots can thereby be formed along the tube, which can then be cut in individual labels to be attached to a sample container.

Because of the flexibility of the tubing material, a label with the desired thickness can be realized. A cover layer made of a plastic film may be bonded over the tubing material in order to ensure scratch resistivity and to protect the label against mechanical impacts, e.g. touching by user or centrifugal forces resulting in warped reservoir geometry. The cover layer may also be adhesive.

A chamber of an acceleration sensitive indicator based on the particle transfer principle may comprise different zones: a fluid compensation zone, an indication zone, a particle collection zone. A "fluid compensation zone" can be an extra space formed intentionally within the chamber or fluidically connected to the chamber, e.g. in the form of one or more channel extensions, e.g. a few millimeter long which is used to compensate for possible fluid volume variations due to manufacturing and dosing tolerances and can provide a volume for possibly encapsulated air, which thus does not interfere with the indication zone. The indication zone can comprise at least one particle transfer zone, which can receive a volume of at least one particle stabilizing fluid comprising stabilized dispersed particles, and can possibly comprise other indication elements, such as a barcode, e.g. printed on a surface of the chamber in this zone. Optionally, special geometric structures can be designed e.g. for confining the particle stabilizing fluid in a particular subarea or for controlling air bubble formation or for drawing overdosed fluid or as particle barriers or particle gates between adjacent particle transfer zones. A "particle collection zone" may be a volume of the chamber dedicated to receive the particles removed from the indication zone during centrifugation. The particle collection zone may otherwise be part of the indication zone.

A chamber of an acceleration sensitive indicator based on the fluid transfer principle may be similar to the chamber of an acceleration sensitive indicator based on the particle transfer principle.

In one embodiment, the indication zone of a fluid transfer based chamber may additionally comprise a solid carrier phase if a stabilized fluid is used. In that case, the solid carrier phase may be placed in the chamber in a first step followed by application of the fluid to be stabilized into the solid carrier phase such as to be saturated with the fluid. Alternatively, the solid carrier phase can be first soaked with the fluid and then placed in the chamber. The solid carrier phase can itself be used as a spacer layer or in combination with a spacer layer as described above. The carrier phase may be adhesive, at least on one side, in order to be correctly fixed and define the position of the chamber. The adhesive can be applied onto the carrier phase, e.g. by screen printing.

Fluid barriers may also be designed in the indication zone, e.g. by leaving gaps between fluid transfer zones. Instead of a particle collection zone, a fluid transfer zone can be used to receive fluid from another fluid transfer zone.

A sample container for centrifuging a biological sample contained therein is also presented. The sample container can have an upper end and a lower end and a symmetry axis from the upper end to the lower end, and can comprise an acceleration sensitive indicator for indicating the centrifugation status of the biological sample upon application of a g-force above a threshold value to the sample container in a direction parallel to the symmetry axis or at an angle from the symmetry axis.

The term "biological sample", as used herein, can refer to a material, in which one or more analytes of interest can be potentially found and, in one embodiment, to a body fluid such as blood but not limited thereto. A sample may be used directly as obtained from the source or following a pretreatment to modify the character of the sample, e.g. after being diluted with another solution or after having being mixed with reagents e.g. to carry out one or more diagnostic assays like e.g. clinical chemistry assays, immunoassays, coagulation assays, nucleic acid testing, and the like. In one embodiment, the sample may require centrifugation, e.g. in order to obtain plasma or serum from blood or in general separation of corpuscular components from the sample. The term "sample" as used herein cannot therefore be only used for the original sample but can also relate to a sample which has already been processed, e.g. centrifuged, pipetted, diluted, mixed with reagents, enriched, having been purified, having been amplified and the like. As used herein, the term "analyte" can refer to the compound or composition to be detected or measured.

The term "sample container" in general can relate to a vessel with a hollow body capable of holding a biological sample and that may comprise a closure. In one embodiment, the sample container may be a sample tube. A "sample tube" can either be a sample collection test tube, also called "primary tube", which can be used to receive a sample from a patient and to transport the sample contained therein to an analytical laboratory for diagnostics purposes, or a "secondary tube", which may be used to receive an aliquot of sample from a primary tube. A primary sample tube can typically be made of glass or plastics, can have a longitudinal body with an open upper end and a closed lower end and a symmetry axis from the upper end to the lower end, wherein the open upper end can typically be closed by a closure. The closure may be of different materials and may have different shapes and colors, typically associated with the type of tube, i.e. the type of sample therein or the type of conditions the sample therein can be subjected to or the type of process the tube and sample therein can be going to be subjected to. A secondary tube can typically be made of plastics and may have a lower degree of variation of size and type with respect to primary tubes. In one embodiment, secondary tubes may be smaller than primary tubes and be designed to be closed with one type or similar types of closure, e.g. of the screw type. Some primary tubes may contain an anticoagulant or a coagulation inducing agent. Some tubes may contain gels or other separation barriers for facilitating the separation of plasma from the blood cells, and the like.

The acceleration sensitive indicator may be located, e.g. attached to or integrated in a wall of the container body or of the closure.

According to some embodiments, the indicator can comprise at least two indication zones symmetrically arranged on either side of a reference line parallel to the symmetry axis of the sample container such as to be simultaneously subjected to the same g-force upon application of a g-force in the direction of the symmetry axis, wherein the at least two indication zones can be identical in order to provide indication redundancy and confirmation of the centrifugation status under the same conditions or wherein the at least two indication zones can be different in order to confirm the centrifugation status under different conditions.

According to some embodiments, the indicator can comprise at least two indication zones symmetrically arranged on either side of a reference line parallel to the symmetry axis or at least one elongated indication zone with a longitudinal axis orthogonal to the reference line such that the at least one fluid or particles can have a distribution with respect to the at least one indication zone, which can be differently changeable upon application of a g-force above a threshold value in a direction at an angle from the symmetry axis with respect to the application of the same g-force in the direction of the symmetry axis. In this way, it can be possible to determine a posteriori what type of centrifuge has been used and in particular if a swinging bucket or a fixed angle centrifuge has been used.

According to some embodiments, the indicator can be a label formed between two opposite foils and can be attached to a side wall of the sample container, wherein the side wall may be a wall of the container body or of the closure.

According to some embodiments, the indicator can be formed between a surface of a cavity on a side wall of the sample container and a foil, wherein the side wall may be a wall of the container body or of the closure.

A centrifuge for centrifuging sample containers is also presented. The centrifuge can comprise a reading device for reading an acceleration sensitive indicator on a sample container, the acceleration sensitive indicator indicative of the centrifugation status of the sample container. The centrifuge can further comprise a processor and a computer-readable non-transitory storage medium having stored computer-interpretable instructions, which, when executed by the processor, can use information read by the reading device from the sample container to determine: if the sample container has been centrifuged to a predetermined degree, and if the sample container has been centrifuged to a predetermined degree interrupting centrifugation of the sample container, or if the sample container has not been centrifuged to a predetermined degree continuing centrifugation for at least a predetermined time or a calculated time and/or adapting the applied g-force. The processor and the computer-readable non-transitory storage medium may be also in an external computer electrically coupled to the centrifuge.

An analytical system for analyzing centrifuged samples is also presented. The analytical system can comprise a reading device to read an acceleration sensitive indicator on a sample container, the acceleration sensitive indicator indicative of the centrifugation status of the sample container. The analytical system can further comprise at least one analyzer electrically coupled to the reading device, a processor electrically coupled to the at least one analyzer, and a computer-readable non-transitory storage medium having stored computer-interpretable instructions, which, when executed by the processor, can use information read by the reading device from the sample container and reacts accordingly. In one embodiment, the system can be configured to determining if the sample container has been centrifuged to a predetermined degree and/or with what type of centrifuge, the predetermined degree and/or type of centrifuge being appropriate for withdrawing an aliquot of sample from the sample container and for analyzing the sample, if the sample container has been centrifuged to a predetermined degree and/or an appropriate centrifuge has been used, instructing the system to withdraw an aliquot of the sample and the analyzer to analyze the aliquot for the presence of one or more analytes, and if the sample tube has not been centrifuged to a predetermined degree and/or an inappropriate centrifuge has been used, conducting a non-analytical process step and/or flagging the sample, e.g. conducting an analytical process and flagging the analysis result.

The centrifuge and/or the analytical system may further comprise reference indicators at e.g. fixed positions to be read by the reading device and to be compared with the acceleration sensitive indicator in order to verify or confirm the centrifugation status.

A "reading device" can be a device that can read a change in distribution of a fluid or particles in the at least one indication zone and/or that can read information displayed as a consequence of such a change in distribution. The reading device can typically be an optical reading device, which may comprise a light source and an optical detector, e.g. a camera, a photodiode, etc. . . . . . The reading device may be for example a bar code reader or any other device that can read e.g. a 1 D or 2D or alpha-numeric code or symbol on the acceleration sensitive indicator. The reading device may be otherwise a device to interpret a change in color or contrast, including intensity or opacity changes, including color gradients or gray scales. Other types of reading devices based on non-optical principles may however be used. One example can be a detector of the hall-effect type capable of detecting e.g. a change in particle distribution if the particles are e.g. magnetic. Other types of reading device may be used based on measuring a change of electrical impedance, resistance or capacitance caused by a change in distribution of a fluid or particles in an indication zone. The acceleration sensitive indicator may comprise e.g. a Radio Frequency Identification tag (RFID), whose signal changes when the distribution of a fluid or particles changes.

Referring initially to FIG. 1, FIG. 1 shows schematically an example of acceleration sensitive indicator 1 for indicating the centrifugation status of a biological sample. The indicator 1 can comprise a closed chamber 2. The chamber 2 can comprise an indication zone 3. The indication zone 3 can comprise two adjacent fluid transfer zones 4, 5 separated by a fluid barrier 6. The fluid transfer zones 4, 5 can comprise readable codes 7, 8 respectively.

Figure 2A:
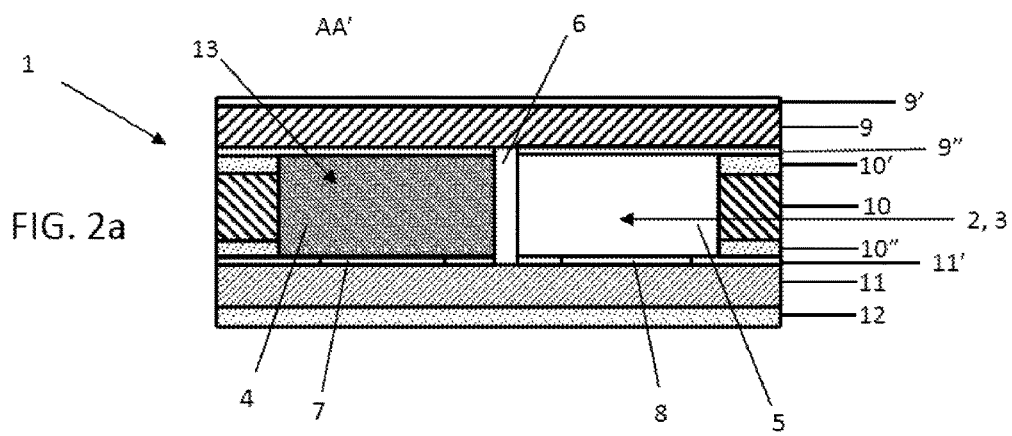
FIG. 2a illustrates a cross-section of the acceleration sensitive indicator of FIG. 1 according to an embodiment of the present disclosure.

FIG. 2a is a schematic and not to scale cross-section of the acceleration sensitive indicator 1 of FIG. 1 though line AA'. In one embodiment, the indicator 1 can comprise from top to bottom a cover layer 9, a spacer layer 10, a backing layer 11 and an adhesive layer 12 for attaching the indicator 1 to a wall of a sample container, where the chamber 2 can be formed between the cover layer 9 and the backing layer 11. The cover layer 9 can be made of transparent polyethylene terephthalate (PET) and can comprise an external acrylic coating 9' conferring scratch resistance and an internal Silicon Oxide coating 9" increasing the fluid tight properties of the cover layer 9 as well as the fluid retaining properties in the fluid transfer zones 4, 5. The thickness of the cover layer 9 including coating layers 9', 9" can be about 75 micrometers. The spacing layer 10 can be made of perforated dark polyethylene (PE) and can comprise adhesive layers 10', 10" for bonding to the cover layer 9 and the backing layer 11. The thickness of the spacing layer 10, including adhesive layers 10', 10" can be about 100 micrometers. The backing layer 11 can be made from white polyethylene and can comprise a printable coating layer 11', on which the readable codes 7, 8 can be printed. The thickness of the backing layer 11, including the coating layer 11' and the adhesive layer 12 can be about 75 micrometers. The acceleration sensitive indicator 1 can thus be embodied as an adhesive label with a total thickness of about 250 micrometers. The fluid transfer zone 4 in FIG. 2a can be filled with a non-stabilized non-Newtonian fluid 13 having thixotropic and/or shear thinning properties. The fluid transfer zone 5 can be empty and can receive the fluid 13 from the fluid transfer zone 4. The fluid barrier 6 can also be empty and comprised between hydrophobic surfaces of the cover layer 9 and the backing layer 11. The non-stabilized non-Newtonian fluid 13 can hide the code 7 from reading whereas the code 8 can be visible and readable.

Figure 2B:
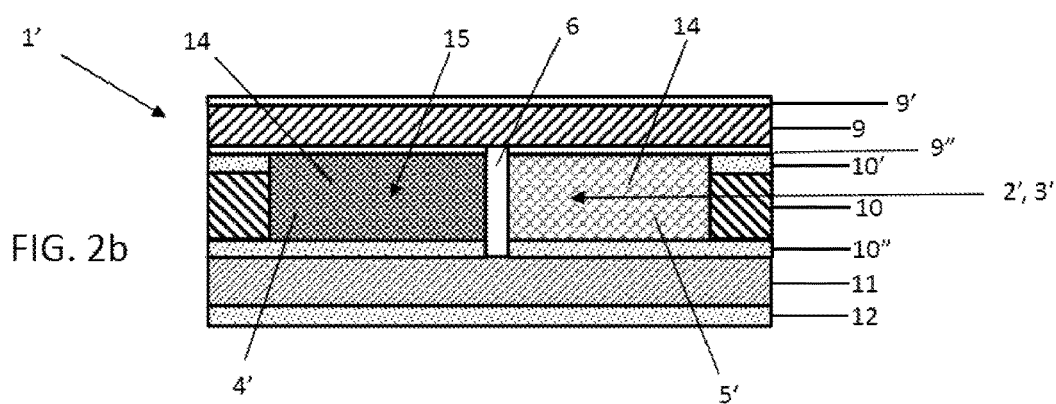
FIG. 2b illustrates a variant of the embodiment of FIG. 2a according to an embodiment of the present disclosure.

FIG. 2b shows an indicator 1', which is a variant of the indicator 1 of FIG. 2a. In one embodiment, the indicator 1' can be similar to the indicator 1 with the difference that the indicator 1' can comprise an indication zone 3' in a closed chamber 2' with two fluid transfer zones 4', 5', each comprising a solid carrier phase 14. The fluid transfer zone 4' can further comprise a fluid 15 stabilized in the solid carrier phase 14, whereas the solid carrier phase 14 in the fluid transfer zone 5' can be empty and can receive the fluid 15 from the fluid transfer zone 4'. The adhesive layer 10" can extend in the fluid transfer zones 4', 5' below the solid carrier phases 14 such as to better fix the solid carrier phases 14 in the indication zone 3'. In this case there can also be no code printed on the backing layer 11. A readable code may however be present in the indication zone 3' analogously to FIG. 2a. Also, both in FIG. 2a and in FIG. 2b, the code 7, 8 may be located on the cover layer 9 rather than on the backing layer 11.

FIGS. 3a-c show schematically some examples of how a change in fluid distribution can be detected using an acceleration sensitive indicator 1, 1' such as that of FIGS. 1, 2a, 2b. In one embodiment, FIG. 3a shows that by placing an indicator 1, 1' in an acceleration field, such that the fluid 13, 15 is subjected to a g-force above a threshold value in the direction from the fluid transfer zone 4, 4' towards the fluid transfer zone 5, 5', the fluid 13, 15' can be transferred from the fluid transfer zone 4, 4' to the fluid transfer zone 5, 5' though the fluid barrier 6. Thereby, the code 7 previously hidden by the fluid 13, 15 can become visible and readable while the code 8 previously visible and readable can become hidden by the fluid 13, 15 and therefore unreadable. It can thus be possible to determine the centrifugation status of a sample, e.g. not centrifuged or centrifuged, depending on which code 7, 8 of the indicator 1, 1' can be read respectively. The same can be determined without the use of a code as shown in FIG. 3b by detecting the transfer of fluid 13, 15 itself. If a stabilized fluid 15' comprising a dye is used and the dye adsorbs to the solid carrier phase 14, part of the dye can remain adsorbed to the solid carrier phase 14 of the fluid transfer zone 4' when the fluid 15' is transferred to the fluid transfer zone 5'. Thus, the centrifugation status may be determined by detecting whether one or both fluid transfer zones 4', 5' are dyed as shown in FIG. 3c.

Figure 4:
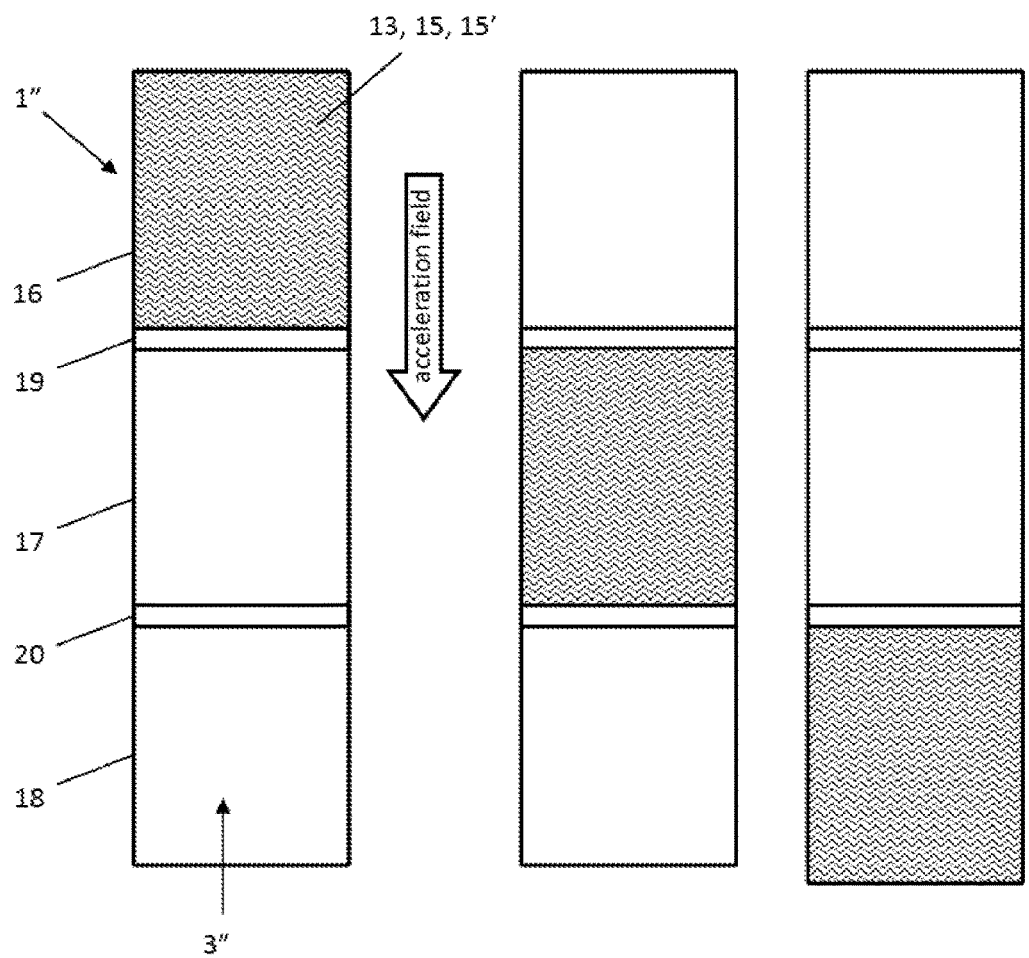
FIG. 4 illustrates schematically an example of how a centrifugation status can be detected and quantified using fluid transfer according to an embodiment of the present disclosure.

FIG. 4 shows schematically an example of how a centrifugation status can be detected and quantified using an acceleration sensitive indicator 1" based on fluid transfer. In one embodiment, the acceleration sensitive indicator 1" can comprise in this case an indication zone 3" with three fluid transfer zones 16, 17, 18 separated by two fluid barriers 19, 20. An increased acceleration field can be required for the fluid 13, 15, 15' to pass from the fluid transfer zone 17 to the fluid transfer zone 18 through the fluid barrier 20 compared to the acceleration field required for the fluid 13, 15, 15' to pass from the fluid transfer zone 16 to the fluid transfer zone 17 through the fluid barrier 19. By detecting the position of the fluid 13, 15, 15' in the acceleration sensitive indicator 1", it can thus be possible to detect the strength of the acceleration field used and/or the approximate period of time that a g-force above a threshold value acted on the indicator F.

FIG. 5 shows schematically another type of acceleration sensitive indicator 31 based on particle transfer. The indicator 31 can comprise a closed chamber 32, the chamber 32 comprising an indication zone 33. The indication zone 33 can comprise a particle transfer zone 34 and a code 37.

FIG. 6a is a schematic and not to scale cross-section of the acceleration sensitive indicator 31 of FIG. 5 though line AA'. In one embodiment, the indicator 31 can comprise from top to bottom a cover layer 39, a spacer layer 40, a backing layer 41 and an adhesive layer 42 for attaching the indicator 31 to a wall of a sample container, where the chamber 32 can be formed between the cover layer 39 and the backing layer 41. The cover layer 39 can be made of transparent polyethylene terephthalate (PET). The spacing layer 40 can be made of perforated dark polyethylene (PE) and can comprise adhesive layers 40', 40" for bonding to the cover layer 39 and the backing layer 41. The backing layer 41 can be made from polyethylene and can comprise a printable coating, on which the code 37 can be printed. The acceleration sensitive indicator 31 can thus be embodied as an adhesive label and can have a total thickness of about 250 micrometers. The particle transfer zone 34 can comprise a particle stabilizing fluid 35 comprising stabilized dispersed particles covering and hiding the code 37.

FIG. 6b shows an indicator 31', which is a variant of the indicator 31 of FIG. 6a. In one embodiment, the indicator 31' can be similar to the indicator 31 with the difference that the indicator 31' can comprise a ticker backing layer 41' and a chamber 32' formed in the backing layer 41'. A spacing layer can therefore be missing in this case.

FIGS. 7a-d show schematically some examples of how a change in the distribution of particles 36 can be detected, which can be indicative of the centrifugation status. In one embodiment, FIGS. 7a-d show that by placing an indicator 31, 31' in an acceleration field, such that the particles 36 can be subjected to a g-force above a threshold value, the particles 36 can change distribution in the particle transfer zone 34, the amount of the change depending on the time the g-force is applied. As a result of this, as shown, for example, in FIG. 7a, the change of distribution can be detected by detecting a change in color or contrast, e.g. a change of intensity or opacity, including color gradients or gray scales, which may occur when the beads 36 start to move in the direction of the acceleration field and can become compacted, leaving a clearer fluid 35 behind. Alternatively, as shown in FIG. 7b, a code 37 previously hidden by the particles 36 may become visible and readable as the particles 36 move out of the reading area. The same can apply if the particles 36 have a lower density than the particle stabilizing fluid 35 (comprising of, for example, air bubbles), as shown in FIG. 7c. The difference in this case can be that the particles 36 can move in a direction opposite to the direction of the acceleration field. Analogously, if the particle stabilizing fluid 35 has a color or opacity, which can hide the code 37, change of distribution of particles 36 such as air bubbles, i.e. moving the air bubbles out of the fluid 35 may cause the fluid 35 to compact, thereby revealing the previously hidden code 37, as shown in FIG. 7d.

FIG. 8 shows schematically an example of how a centrifugation status can be detected and quantified using an acceleration sensitive indicator 51 based on the particle transfer principle. The indicator 51 can comprise an indication zone 53 comprising a particle transfer zone 54 and three linearly arranged codes 57, 58, 59. The indicator 51 can also comprise a code 56 outside of the particle indication zone 53. The code 56 can always be readable and can indicate whether the indicator 51 is present on a sample container and/or if a sample container comprising the indicator 51 is present. The codes 57, 58, 59 can be hidden at the beginning by the particles 36 in the particle stabilizing fluid 35. Therefore, if none of the codes 57, 58, 59 is readable, this can indicate that the sample was not centrifuged. FIGS. 8a-b show how the particles 36 can change distribution in the particle transfer zone 54 when placing the indicator 51 in an acceleration field. In one embodiment, depending on the strength of the acceleration field, hence on the g-force which can be applied above a threshold value and on how long it is applied, the particles 36 can move to a different extent revealing the codes 57, 58, 59. Thus, depending on how many codes 57, 58, 59 are readable, it can be determined not only if the sample was centrifuged, but also if it was centrifuged correctly, i.e. with correct g-force and time, or incorrectly. For example, FIG. 8a, where the first code 57 is only partially readable, can indicate that the centrifugation conditions were not sufficient, i.e. too low g-force and/or too short time. FIGS. 8b-c, where the first code 57 is completely readable, can indicate that the sample was correctly centrifuged. FIG. 8d, where the first code 57 and the second code 58 are completely readable, can indicate that the sample was incorrectly centrifuged and in particular that the g-force was too high and/or that the time a g-force above a threshold value was applied was too long. FIG. 8e, where all codes 57, 58, 59 are readable, can indicate that most likely a leakage occurred and the centrifugation cannot be determined.

An example of particle stabilizing fluid can be an aqueous fluid comprising of 0.5% polyacrylic acid such as Carbopol neutralized at pH 7 with KOH and comprising 20% w/w BaTiO3 particles with an average diameter of about 100 nm. With such a formulation, a covered code 57 can become completely readable after about 5 minutes at about 4000 g or about 10 minutes at about 2000 g to give an example.

Figure 18:
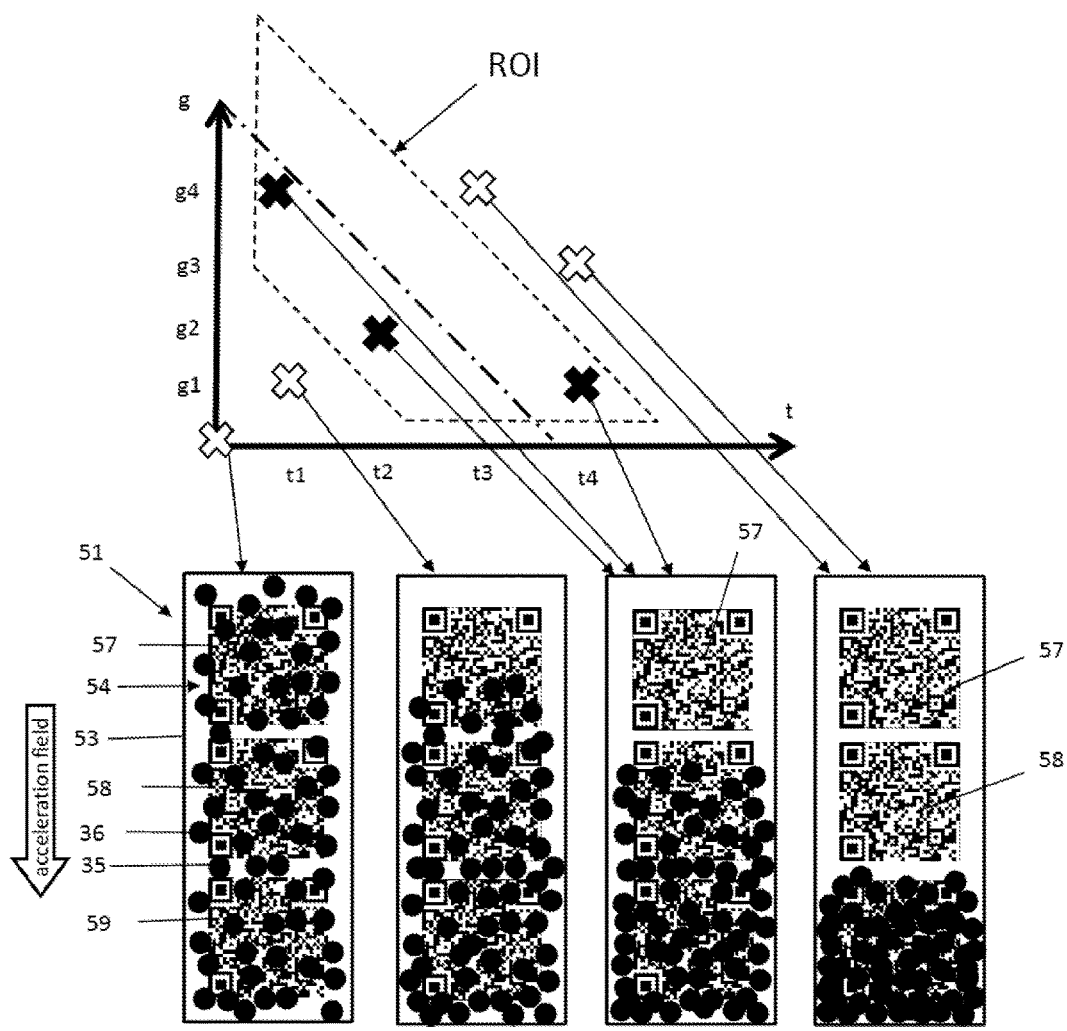
FIG. 18 illustrates how the centrifugation status is affected by different combinations of g-forces and centrifugation times for an embodiment using particle transfer such as that of FIG. 8 according to an embodiment of the present disclosure.

FIG. 18 shows how the centrifugation status is affected by different combinations of g-forces and centrifugation times for an embodiment using particle transfer such as that of FIG. 8. In one embodiment, a graph representing g force (g) versus time (t) shows a region of interest (ROI), in which some combinations of g force and time (represented by black crosses), can give the same acceptable result in terms of particle migration, where the first code 57 is completely readable indicating that the sample was correctly centrifuged. The region of interest can be chosen as mentioned above to be comprised e.g. between about 300 g and about 4000 g for the g force and between a few seconds and several minutes for the time. The graph can also show that other combinations of g force and time falling out of the region of interest (represented by white crosses) result in either an insufficient centrifugation or in an excess of centrifugation, both of which conditions can be detected by the acceleration sensitive indicator 51.

Figure 19:
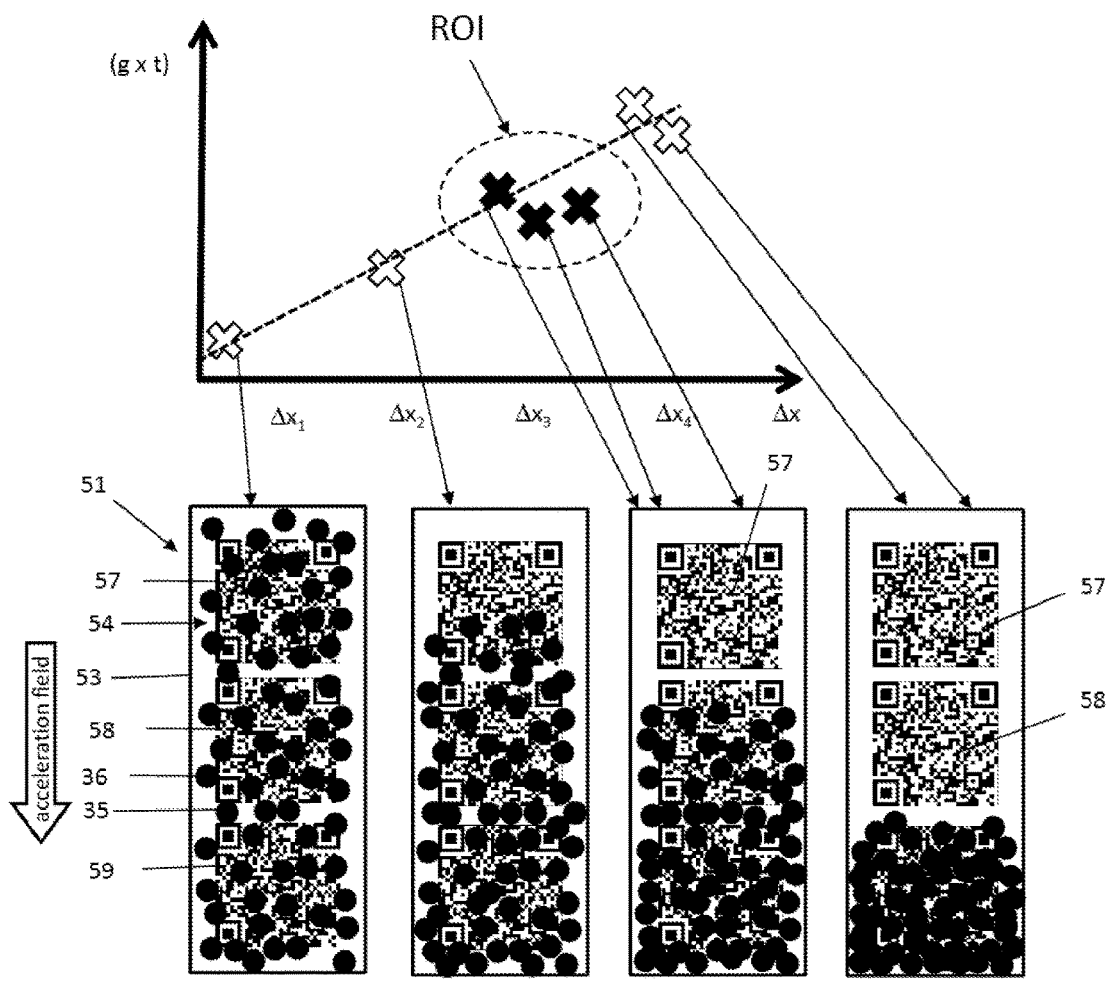
FIG. 19 illustrates how the migration of particles is affected by different combinations of g-forces and centrifugation times according to an embodiment of the present disclosure.

FIG. 19 shows with a graph in manner similar to FIG. 18 how the migration of particles (Δx) can be affected by different combinations of g-forces and centrifugation times (g×t). In one embodiment, FIG. 19 shows a proportional relationship between the value of g×t and the migration distance. Again, only some combinations of g×t (black crosses) in a region of interest (ROI) can provide the desired result in terms of particle migration, where the first code 57 is completely readable indicating that a correct centrifugation status. The graph can also show that other combinations of g force time that fall out of the region of interest (represented by white crosses) result in either an insufficient migration or in an excess of migration, both of which conditions can be detected by the acceleration sensitive indicator 51 to indicate the centrifugation status.

FIGS. 9 to 11 show schematically other examples of how the centrifugation status can be detected and quantified using particle transfer. In one embodiment, FIG. 9 shows an indicator 61 comprising an indication zone 63 comprising a barcode 67 covered by a particle stabilizing fluid 35 comprising particles 36. As the particles 36 move in an acceleration field, a larger area of the barcode 67 can become visible in proportion to the applied g-force and duration of application. Measuring the length of the readable area of the barcode 67 can thus provide a measure of the centrifugation status.

FIG. 10 shows an indicator 71 comprising an indication zone 73 comprising a plurality of particle transfer zones 74, 75, 76, 77 separated by particle barriers 78, 79, 80. The particle transfer zones 74, 75, 76, 77 can be different with respect to each other so that an increasing acceleration field, e.g. a greater g-force and/or a longer period of time at a certain g-force above a threshold value can be needed in order for the particles 36 to move of the same distance in the respective particle transfer zone 74, 75, 76, 77. The particles 36 cannot pass through the particle barriers 78, 79, 80, so that the particles 36 in each particle transfer zone 74, 75, 76, can accumulate against a respective barrier 78, 79, 80. The more the particles 36 move, the more they can become denser and visible as a band. Counting the number of bands or determining the degree of compaction in each particle transfer zone 74, 75, 76, 77 can provide an estimate of the acceleration field used and therefore of the centrifugation status.

Instead of particle barriers 78, 79, 80 also particle gates may be used, which allow passage of the particles 36. The particles 36 and the particles transfer zones 74, 75, 76, 77 may be the same with respect to each other. Analogously to FIG. 4, an increased acceleration field may be required for the particles 36 to pass from a particle transfer zone to the next particle transfer zone via the particle gates in the direction of the acceleration field. It can thus be possible to detect the strength of the acceleration field used and estimate the duration of time the acceleration field acted on the indicator 71 by detecting in which particle transfer zone(s) 74, 75, 76, 77 the particles 36 can be located.

FIG. 11 shows an acceleration sensitive indicator 81 comprising an indication zone 93 comprising one particle transfer zone 82 comprising a particle stabilizing fluid 83 comprising a mixture of different particles 84, 85, 86, 87 only in the upper part. The particles 84, 85, 86, 87 can have different size and/or density. When placing the indicator 81 in an acceleration field, the particles 84, 85, 86, 87 can move to a different extent through the particle stabilizing medium in the direction of the acceleration field becoming separated in bands. The separation effect can be similar to the separation of molecules obtained with gel chromatography or gel electrophoresis. Depending on the strength of the acceleration field, hence on the g-force which is applied above a threshold value and on how long it is applied, the bands of particles 84, 85, 86, 87 can become separated to a different extent, which can be indicative of the centrifugation status.

Figures 12, 12A, 12B:
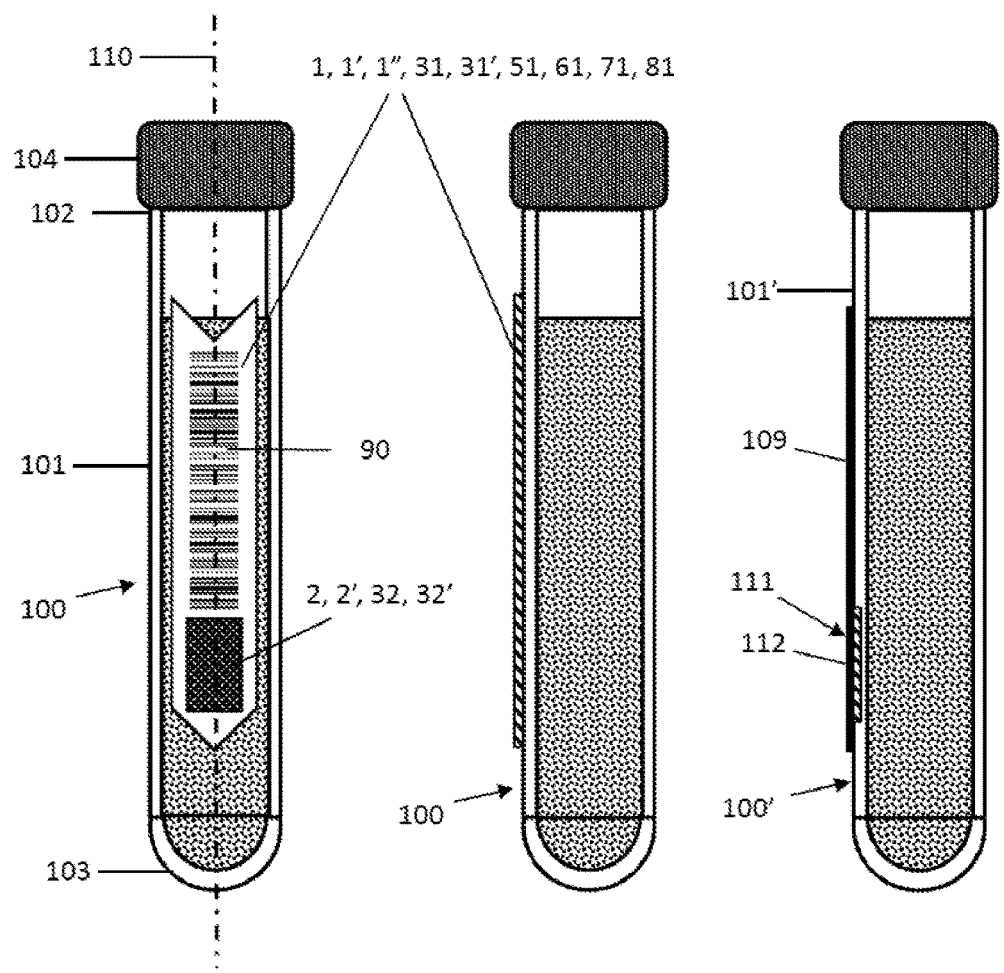
FIGS. 12 and 12a illustrate schematically a sample container comprising an acceleration sensitive indicator according to an embodiment of the present disclosure.
FIG. 12b illustrates a variant of the sample container of FIGS. 12 and 12a according to an embodiment of the present disclosure.

FIG. 12 and FIG. 12a show schematically a sample container 100 comprising an acceleration sensitive indicator such as indicator 1, 1', 1", 31, 31', 51, 61, 71, 81. The sample container 100 can be a primary tube having a longitudinal body 101 with an open upper end 102 and a closed lower end 103 and a symmetry axis 110 from the upper end 102 to the lower end 103, the open upper end 102 being closed by a closure 104. The acceleration sensitive indicator 1, 1', 1", 31, 31', 51, 61, 71, 81 can be attached to the container body 101 as a label. The label can, in this case, be designed with a longitudinal arrow shape, which can facilitate correct attachment to the container body, i.e. parallel to the symmetry axis 110 and head down towards the lower end 103. The indicator 1, 1', 1", 31, 31', 51, 61, 71, 81 can comprise a chamber 2, 2', 32, 32' comprising an indication zone and a barcode 90 outside of the indication zone, similar to code 56 in FIG. 8. The barcode 90 can always be readable and can indicate whether the indicator 1, 1', 1", 31, 31', 51, 61, 71, 81 is present on the sample container 100 and/or if a sample container 100 comprising the indicator 1, 1', 1", 31, 31', 51, 61, 71, 81 is present and/or contains information relative to the sample tube 100 and/or the sample in the sample tube 100.

FIG. 12b shows a sample container 100', which is a variant of the sample container 100 of FIG. 12 and FIG. 12a. The difference with the sample container 100 can be that the sample container 100' can comprise an acceleration sensitive indicator 111, which can be an integrated part of the sample container 100' rather than a label 1, 1', 1", 31, 31', 51, 61, 71, 81 attached to the sample container 100. In one embodiment, the indicator 111 can comprise a chamber 112 formed in a wall 101 of the sample container 100', which can be closed by a cover layer 109 attached to the wall 101'.

FIG. 13 shows schematically an acceleration sensitive indicator 121 similar to that of FIG. 8, which can comprise two indication zones 123, 124 instead of one, each comprising one particle transfer zone 122, 125 respectively. In one embodiment, the indications zones 123, 124 can be symmetrically arranged on either side of a reference line 120 to be arranged parallel to the symmetry axis 110 of a sample container 100, 100' (not shown in FIG. 13), such as to be simultaneously subjected to the same g-force upon application of a g-force in the direction of the symmetry axis 110. The indication zones 123, 124 may be identical, as shown in FIG. 13a, in order to provide indication redundancy and confirmation of the centrifugation status under the same conditions. In this case, if a single code 127, 128 is completely readable in each indication zone 123, 124 respectively, there can be indication that the sample was correctly centrifuged. FIG. 13b shows an acceleration sensitive indicator 121', which is a variant of the indicator 121 of FIG. 13a. In one embodiment, it can comprise two different indication zones 123, 124' comprising different particle transfer zones 122, 125' respectively, in order to confirm the centrifugation status under different conditions. In this case, indication of correct centrifugation of the sample can be provided if one code 127 and two codes 128, 129 are completely readable in the indication zones 123, 124' respectively.

Figure 14A:
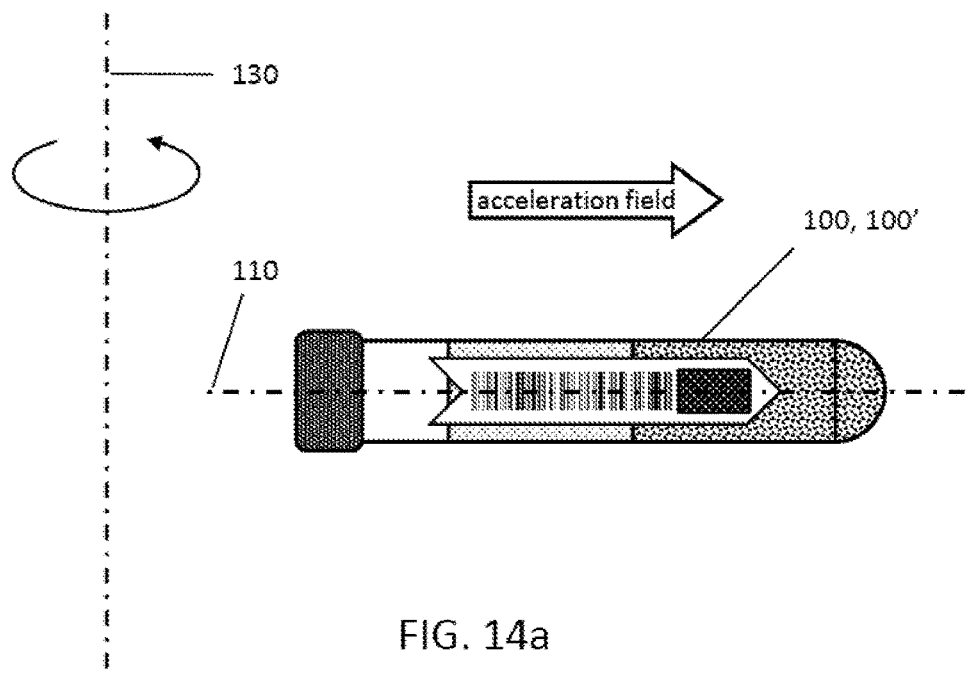
FIGS. 14a-b illustrate two possible ways of placing a sample container such as that of FIG. 12 in an acceleration field according to an embodiment of the present disclosure.
Figure 14B:
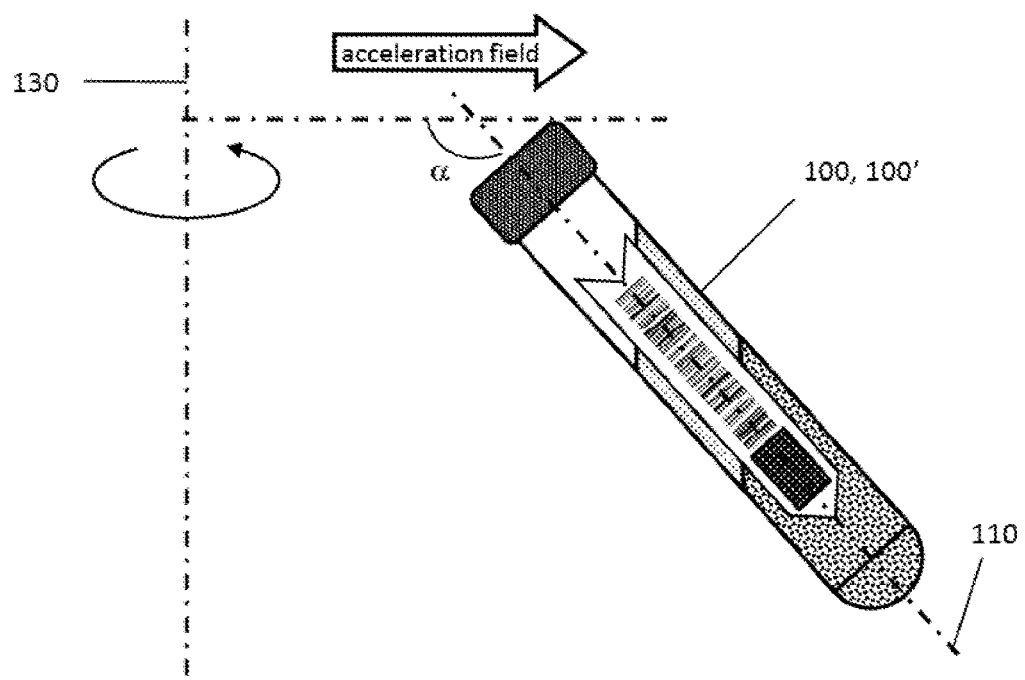

FIGS. 14a-b show schematically two possible ways of placing a sample container 100, 100' in an acceleration field. In one embodiment, there can be at least two types of centrifuge for centrifuging samples in sample containers 100, 100'. There can be centrifuges of the swing-type, where a plurality of sample tubes 100, 100' may be placed in respective swing-bucket receptacles (not shown). Upon centrifugation, the sample containers 100, 100' can swing radially outwards so that their symmetry axis 110 can be substantially parallel to the acceleration field, orthogonal to an axis of rotation 130, as shown in FIG. 14a. There can also be centrifuges where a plurality of sample containers 100, 100' may be placed in respective bucket receptacles (not shown), which can maintain a fixed angle during centrifugation with respect to the axis of rotation 130. The sample containers 100, 100' can thus maintain the same orientation throughout the centrifugation with their symmetry axis 110 at a fixed angle cc with respect to the acceleration field, as shown in FIG. 14b.

FIG. 15 shows schematically an example of acceleration sensitive indicator 131, which to determine a posteriori with which orientation a sample container 100, 100' was placed in an acceleration field. The indicator 131 can be similar to the indicator 121 of FIGS. 13 and 13a and can comprise two identical indication zones 133, 134 and one common particle transfer zone 135 in the same chamber 132, symmetrically arranged on either side of a reference line 140 to be arranged parallel to the symmetry axis 110 of a sample container 110, 100' (not shown in FIG. 15). The indicator 131 can thus be elongated, i.e. extended or broadened in a direction orthogonal to the reference line 140. This design can allow the two indication zones 133, 134 to cover different areas, e.g. different sides of a container wall 101, 101'. In this way, the particle distribution change in the indication zones 133, 134 can change differently when placing the sample container 100, 100' in an acceleration field with its symmetry axis 110 parallel to the acceleration field, as shown in FIG. 14a, compared to placing the same sample container 100, 100' in an acceleration field with its symmetry axis 110 at a fixed angle with respect to the acceleration field, as shown in FIG. 14b. In one embodiment, when a sample container 100, 100' is placed in an acceleration field as in FIG. 14a, the particle distribution can change uniformly in both the indication zones 133, 134, as shown in FIG. 15a. In this case, two readable codes 137, 138 can indicate that the sample was correctly centrifuged and that the type of centrifuge used was a swinging-bucked centrifuge. When a sample container 100, 100' is placed in an acceleration field as in FIG. 14b, the particle distribution can change differently in the indication zones 133, 134, as shown in FIG. 15b. In this case, only one completely readable code 137 in one of the indication zones 133, can indicate that the sample was correctly centrifuged and that the type of centrifuge used was of the fixed angle type.

Figure 16:
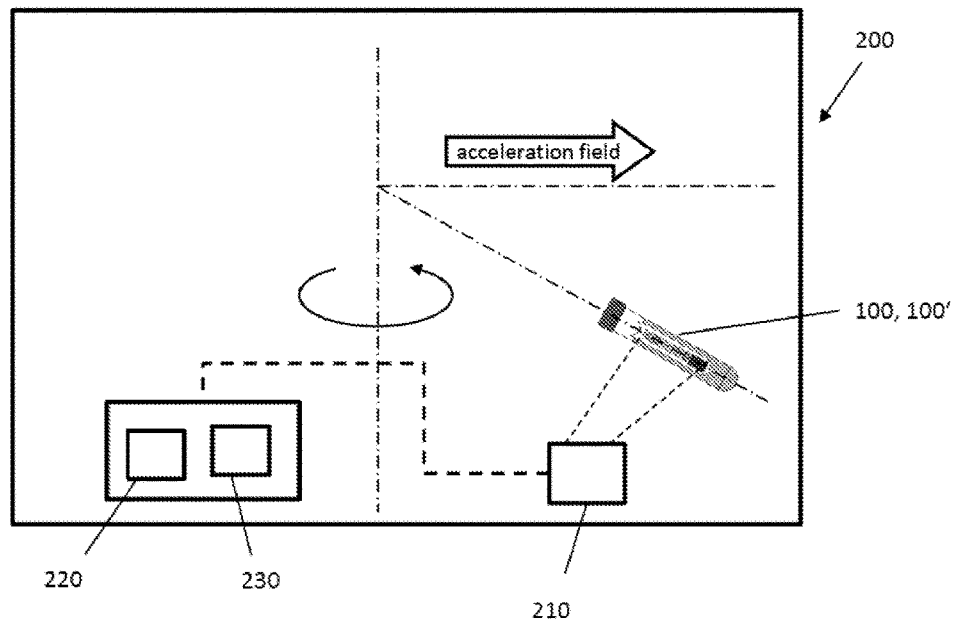
FIG. 16 illustrates schematically a centrifuge according to an embodiment of the present disclosure.

FIG. 16 shows schematically a centrifuge 200 for centrifuging sample containers 100, 100'. The centrifuge 200 can comprise an optical reading device 210, embodied as a barcode and/or 2D-code reader for reading barcodes 67, 90 and/or 2D-codes 7, 8, 37, 56, 57, 58, 59, 127, 128, 129, 133, 134 of an acceleration sensitive indicator 1, 1', 1", 31, 31', 51, 61, 71, 81, 121, 121', 131 on a sample container 100, 100', the acceleration sensitive indicator 1', 1", 31, 31', 51, 61, 71, 81, 121, 121', 131 indicative of the centrifugation status of the sample container 100, 100' and the sample contained therein. The centrifuge 200 can further comprise a processor 220 and a computer-readable non-transitory storage medium 230 having stored computer-interpretable instructions, which, when executed by the processor 220, can use information read by the reading device 210 from the sample container 100, 100' to determine if the sample container 100, 100' has been centrifuged to a predetermined degree; if the sample container has been centrifuged to a predetermined degree interrupting centrifugation of the sample container 100, 100'; if the sample container 100, 100' has not been centrifuged to a predetermined degree continuing centrifugation for at least a predetermined time or a calculated time and/or adapting the applied g-force. Reading may occur before starting centrifugation and/or after interrupting centrifugation, before eventually restarting centrifugation under the same or different conditions. The centrifuge 200 may be of the swinging-bucket or fixed angle type.

Figure 17:
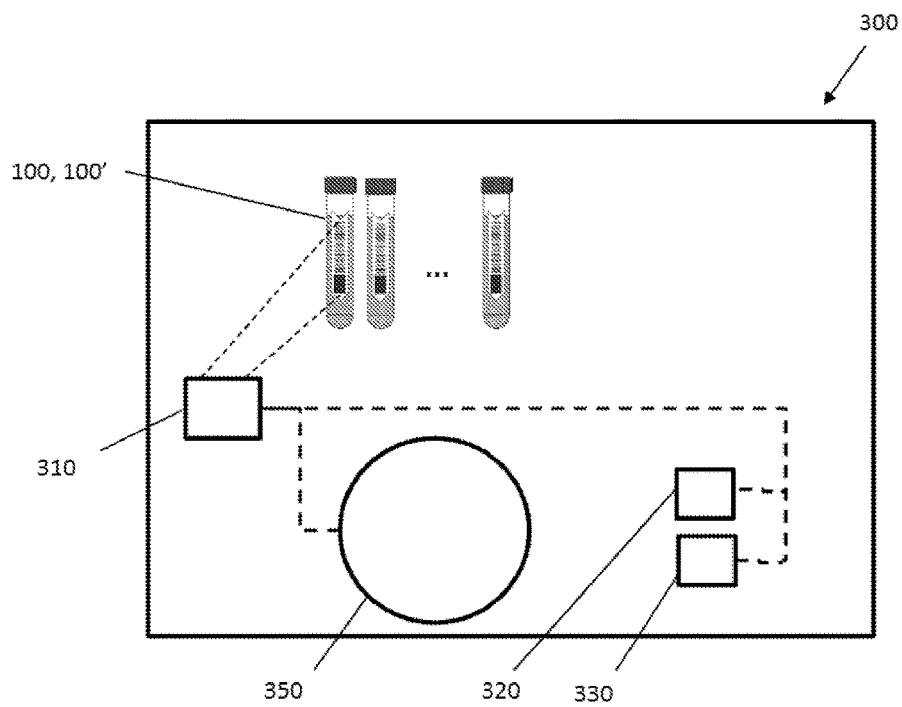
FIG. 17 illustrates schematically an analytical system according to an embodiment of the present disclosure.

FIG. 17 shows schematically an analytical system 300 for analyzing centrifuged samples, the analytical system 300 comprising a reading device 310, embodied as a barcode and/or 2D-code reader for reading barcodes 67, 90 and/or 2D-codes 7, 8, 37, 56, 57, 58, 59, 127, 128, 129, 133, 134 of an acceleration sensitive indicator 1, 1', 1", 31, 31', 51, 61, 71, 81, 121, 121', 131 on a sample container 100, 100', the acceleration sensitive indicator 1', 1", 31, 31', 51, 61, 71, 81, 121, 121', 131 indicative of the centrifugation status of the sample container 100, 100' and the sample contained therein. The analytical system 300 can further comprise an analyzer 350 electrically coupled to the reading device 310, a processor 320 electrically coupled to the analyzer 350 and a computer-readable non-transitory storage medium 330 having stored computer-interpretable instructions, which, when executed by the processor 320, can use information read by the reading device 310 from the sample container 100, 100' to determine if the sample container 100, 100' has been centrifuged to a predetermined degree and/or with what type of centrifuge 200, the predetermined degree and/or type of centrifuge being appropriate for withdrawing an aliquot of sample from the sample container 100, 100' and for analyzing the sample; if the sample container 100, 100' has been centrifuged to a predetermined degree and/or an appropriate centrifuge 200 has been used, instructing the system 300 to withdraw an aliquot of the sample and the analyzer 350 to analyze the aliquot for the presence of one or more analytes, and if the sample container 100, 100' has not been centrifuged to a predetermined degree and/or an inappropriate centrifuge 200 has been used, conducting a non-analytical process step and/or flagging the sample.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. An acceleration sensitive indicator for indicating a centrifugation status of a biological sample, the acceleration sensitive indicator comprising:
at least one closed chamber formed between two opposite surfaces, wherein the chamber comprises at least one indication zone, the at least one indication zone comprising at least two fluid transfer zones or at least one particle transfer zone, wherein at least one fluid transfer zone comprises,
at least one solid carrier phase made of a porous adsorbing material and at least one fluid stabilized in the porous adsorbing material, wherein a g-force above a threshold-value is required in order for the at least one fluid to move out of the fluid transfer zone and out of the porous adsorbing material and to change distribution with respect to the at least one indication zone, or
at least one non-stabilized non-Newtonian fluid having thixotropic and/or shear thinning properties wherein a shear stress induced by a g-force above a threshold-value is required in order for the non-Newtonian fluid to move out of the fluid transfer zone and to change distribution with respect to the at least one indication zone;
wherein the at least one particle transfer zone comprises, at least one particle stabilizing fluid comprising stabilized dispersed particles, the particle stabilizing fluid having a particle stabilizing yield value, which allows the particles to be stabilized below a g-force threshold value, and to change distribution with respect to the at least one indication zone only upon application of a g-force above a threshold value, the change of distribution of the at least one fluid or particles indicating the centrifugation status.

2. The acceleration sensitive indicator according to claim 1, wherein the particle stabilizing fluid is a plastic fluid, a hydrogel, an organogel or combinations thereof.

3. The acceleration sensitive indicator according to claim 1, wherein the at least one fluid comprises a dye and/or is colored.

4. The acceleration sensitive indicator according to claim 1, wherein the indication zone comprises a fluid barrier between adjacent fluid transfer zones and wherein the at least one fluid is transferable at least in part between the fluid transfer zones via the fluid barrier only upon application of a g-force above the threshold value.

5. The acceleration sensitive indicator according to claim 1, wherein at least one fluid transfer zone comprises at least one fluid, which is replaceable at least in part by at least another fluid of a different color and/or different opacity from another fluid transfer zone.

6. The acceleration sensitive indicator according to any of the claim 5, wherein the at least one fluid is adsorbable by the porous solid carrier phase such as to remain adsorbed at least in part to the solid porous material of a fluid transfer zone when the fluid is transferred.

7. The acceleration sensitive indicator according to claim 1, wherein the particles are deformable upon application of a g-force above the threshold value.

8. The acceleration sensitive indicator according to claim 1, further comprising,
at least two indication zones different from each other, wherein the at least one fluid or particles have a distribution with respect to the respective indication zone which is differently changeable upon application of a g-force above a threshold value.

9. The acceleration sensitive indicator according to claim 1, wherein the at least one indication zone further comprises a pattern which becomes distinguishable or indistinguishable from a background or is otherwise altered upon changing the distribution of the at least one fluid or particles.

10. A sample container for centrifuging a biological sample contained therein, the sample container comprising:
an upper end;
a lower end;
a symmetry axis from the upper end to the lower end; and
an acceleration sensitive indicator according to claim 1 for indicating the centrifugation status of the biological sample upon application of a g-force above a threshold value to the sample container in a direction parallel to the symmetry axis or at an angle (a) from the symmetry axis.

11. The sample container according to claim 10, wherein the indicator comprises at least two indication zones symmetrically arranged on either side of a reference line parallel to the symmetry axis such as to be simultaneously subjected to the same g-force upon application of a g-force in the direction of the symmetry axis, wherein the at least two indication zones are identical in order to provide indication redundancy and confirmation of the centrifugation status under the same conditions.

12. The sample container according to claim 10, wherein the indicator comprises at least two indication zones symmetrically arranged on either side of a reference line parallel to the symmetry axis such as to be simultaneously subjected to the same g-force upon application of a g-force in the direction of the symmetry axis, wherein the at least two indication zones are different in order to confirm the centrifugation status under different conditions.

13. The sample container according to claim 10, wherein the indicator comprises at least two indication zones symmetrically arranged on either side of a reference line parallel to the symmetry axis or at least one elongated indication zone with a longitudinal axis orthogonal to the reference line such that the at least one fluid or particles have a distribution with respect to the at least one indication zone, which is differently changeable upon application of a g-force above a threshold value in a direction at an angle ($\alpha$) from the symmetry axis with respect to the application of the same g-force in the direction of the symmetry axis.

14. The sample container according to claim 10, wherein the indicator is a label formed between two opposite foils and attached to a side wall of the sample container.

15. The sample container according to claim 10, wherein the indicator is formed between a surface of a cavity on a side wall of the sample container and a foil.

16. A centrifuge for centrifuging sample containers, the centrifuge comprising:
a sample container according to claim 10
a reading device for reading the acceleration sensitive indicator on the sample container according to claim 10, wherein the acceleration sensitive indicator is indicative of the centrifugation status of the sample container;
a processor; and
a computer-readable non-transitory storage medium having stored computer-interpretable instructions, which, when executed by the processor, use information read by the reading device to determine,
if the sample container has been centrifuged to a predetermined degree,
if the sample container has been centrifuged to a predetermined degree interrupting centrifugation of the sample container, and/or
if the sample container has not been centrifuged to a predetermined degree, continuing centrifugation for at least a predetermined time or a calculated time and/or adapting the applied g-force.

17. An analytical system for analyzing centrifuged samples, the analytical system comprising:
a sample container according to claim 10
a reading device for reading the acceleration sensitive indicator on the sample container according to claim 10, wherein the acceleration sensitive indicator is indicative of the centrifugation status of the sample container;
at least one analyzer electrically coupled to the reading device;
a processor electrically coupled to the at least one analyzer; and
a computer-readable non-transitory storage medium having stored computer-interpretable instructions, which, when executed by the processor, use information read by the reading device to determine:
if the sample container has been centrifuged to a predetermined degree and/or with what type of centrifuge, the predetermined degree and/or type of centrifuge being appropriate for withdrawing an aliquot of sample from the sample container and for analyzing the sample,
if the sample container has been centrifuged to a predetermined degree and/or an appropriate centrifuge has been used, instructing the system to withdraw an aliquot of the sample and the analyzer to analyze the aliquot for the presence of one or more analytes, and/or if the sample container has not been centrifuged to a predetermined degree and/or an inappropriate centrifuge has been used, conducting a non-analytical process step and/or flagging the sample.

\* \* \* \* \*